(12) United States Patent
Oishi

(10) Patent No.: US 11,106,470 B2
(45) Date of Patent: Aug. 31, 2021

(54) UPDATING SETTING VALUES IN A PRINT PRESETTING AND SELECTIVELY APPLYING THE PRESETTING UPDATES TO PARTS OF PRINT WORKFLOWS

(71) Applicant: CANON KABUSHIKI KAISHA, Tokyo (JP)

(72) Inventor: Tetsu Oishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 16/793,236

(22) Filed: Feb. 18, 2020

(65) Prior Publication Data
US 2020/0301713 A1  Sep. 24, 2020

(30) Foreign Application Priority Data
Mar. 18, 2019 (JP) .............................. JP2019-050234

(51) Int. Cl.
*G06F 3/12* (2006.01)
*G06F 9/38* (2018.01)
*G06F 16/9035* (2019.01)
*G06F 9/50* (2006.01)

(52) U.S. Cl.
CPC .......... *G06F 9/3891* (2013.01); *G06F 3/1253* (2013.01); *G06F 9/5016* (2013.01); *G06F 16/9035* (2019.01)

(58) Field of Classification Search
CPC ............................. G06F 3/1258; G06F 3/1253
See application file for complete search history.

(56) References Cited

U.S. PATENT DOCUMENTS

| 8,305,626 | B2 | 11/2012 | Takei | |
|---|---|---|---|---|
| 2012/0176632 | A1* | 7/2012 | Katano | ................ B41J 2/2114 |
| | | | | 358/1.9 |
| 2015/0277827 | A1* | 10/2015 | Oonami | ................ G06F 3/1232 |
| | | | | 358/1.15 |
| 2019/0303076 | A1* | 10/2019 | Kato | ...................... G06F 3/1254 |
| 2020/0125301 | A1* | 4/2020 | Kaneda | ................ G06F 3/1257 |

FOREIGN PATENT DOCUMENTS

| JP | 2005-316904 A | 11/2005 |
|---|---|---|
| JP | 2010-097454 A | 4/2010 |

* cited by examiner

*Primary Examiner* — Jacob Petranek
(74) *Attorney, Agent, or Firm* — Venable LLP

(57) ABSTRACT

An information processing apparatus includes a setting unit configured to receive designation of a setting value for one or a plurality of parts if a workflow for generating a product formed by one or a plurality of parts is set, and a management unit configured to manage, as a setting value for a part, a presetting in which a set of setting values capable of being shared is defined. If a change in a setting value for a part to which a setting is made using a first presetting managed by the managing unit is received, the setting unit further receives designation of a range which reflects the change in the setting value.

15 Claims, 30 Drawing Sheets

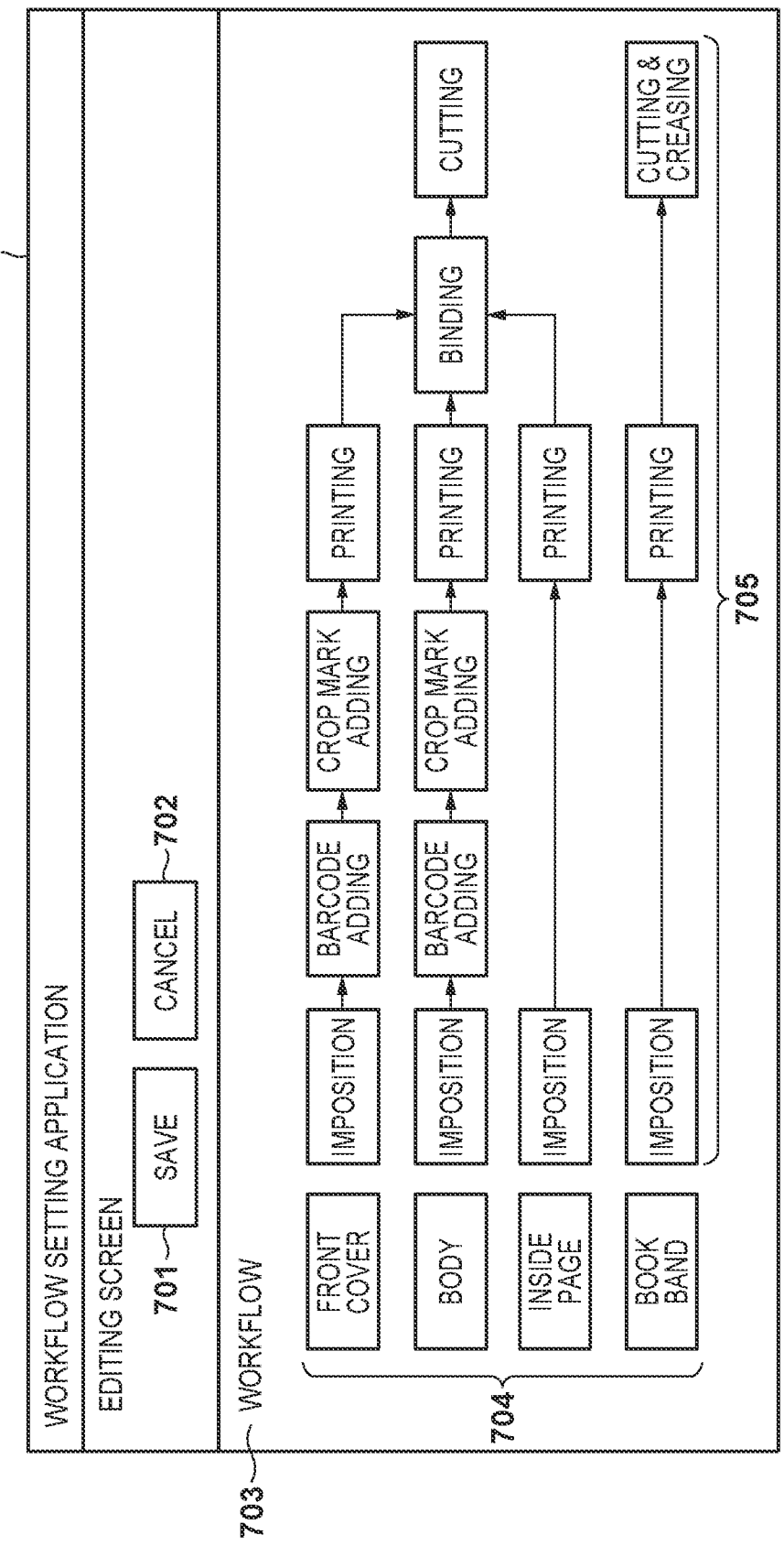

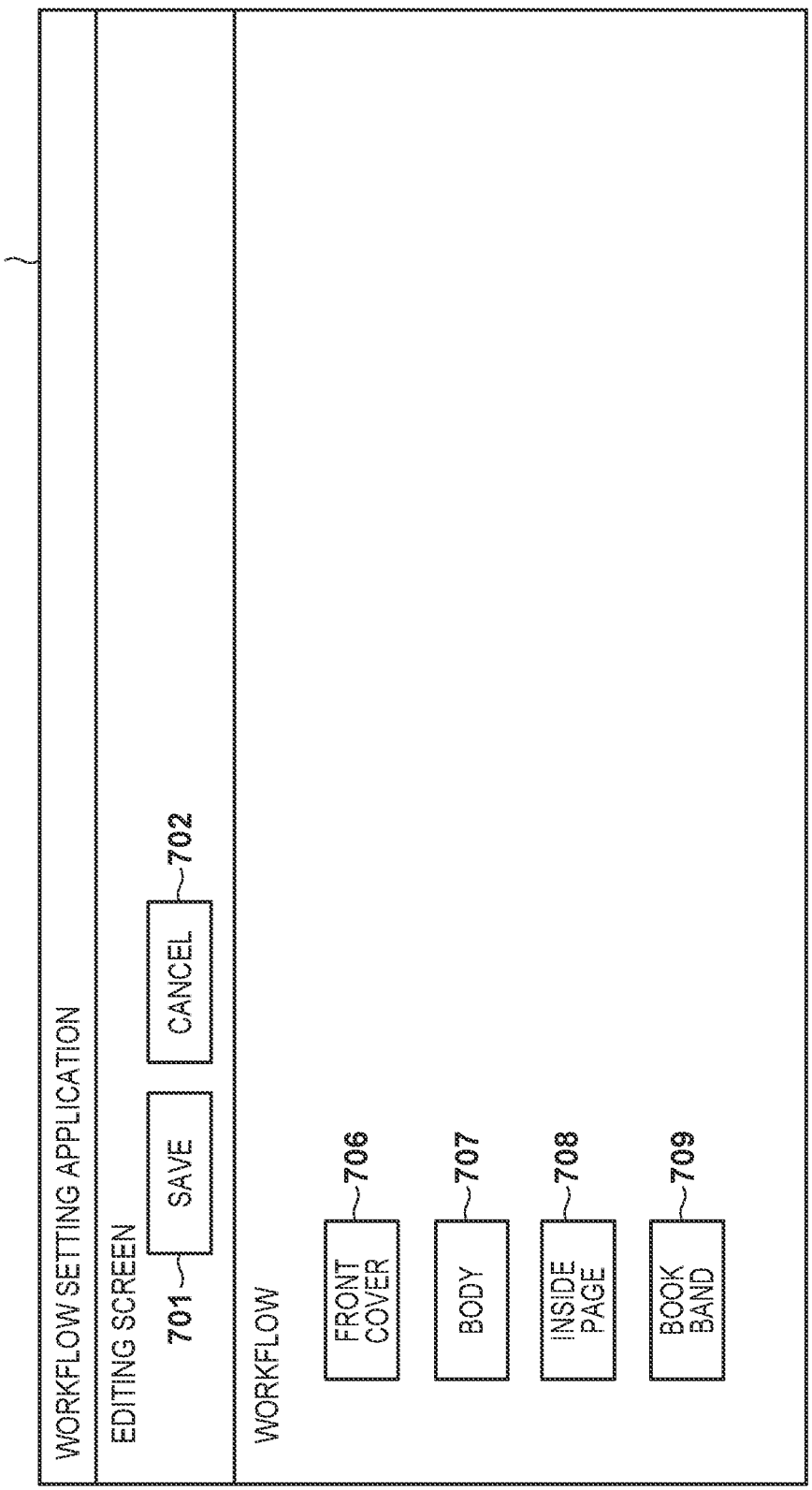

FIG. 9

| ID | NAME | PRODUCT TYPE | PART 1 | PART 2 | PART 3 | PART 4 |
|---|---|---|---|---|---|---|
| 001 | xxx MANUAL | MANUAL | FRONT COVER | BODY | – | – |
| 002 | LEAFLET xxx | LEAFLET | BODY | – | – | – |
| 003 | xxxxx CATALOG | CATALOG | FRONT COVER | BODY | – | – |
| 004 | xxx BOOKLET | BOOKLET | FRONT COVER | BODY | INSIDE PAGE | BOOK BAND |
| 005 | SIGNBOARD xxxx | SIGNBOARD | BODY | – | – | – |
| .... | .... | .... | .... | .... | .... | .... |

| ITEM | VALUE |
|---|---|
| PRESETTING | A4 2UP to A3 |
| SETTING VALUE ID | 000023 |

FIG. 10B

| ITEM | VALUE |
|---|---|
| SETTING VALUE ID | 000023 |
| OUTPUT SHEET SIZE (WIDTH) | 329 |
| OUTPUT SHEET SIZE (HEIGHT) | 483 |
| ORIENTATION | BESIDE |
| FINISHED SIZE (WIDTH) | 297 |
| FINISHED SIZE (HEIGHT) | 420 |
| FINISHED ORIENTATION | BESIDE |
| IMPOSITION (ROW) | 1 |
| IMPOSITION (COLUMN) | 2 |

FIG. 10C

| ITEM | VALUE |
|---|---|
| NAME | A COMPANY : A4 SADDLE STITCH BOOKBINDING |
| PRODUCT TYPE | MANUAL |
| PART | BODY |
| PROCESS | IMPOSITION |
| PRESETTING | A4 2UP to A3 |
| SETTING VALUE ID | |

FIG. 10D

| ITEM | VALUE |
|---|---|
| NAME | A COMPANY : A4 SADDLE STITCH BOOKBINDING |
| PRODUCT TYPE | MANUAL |
| PART | FRONT COVER |
| PROCESS | IMPOSITION |
| PRESETTING | A4 2UP to A3 |
| SETTING VALUE ID | |

FIG. 11A

| ITEM | VALUE |
|---|---|
| SETTING VALUE ID | 000024 |
| OUTPUT SHEET SIZE (WIDTH) | 329 |
| OUTPUT SHEET SIZE (HEIGHT) | 483 |
| ORIENTATION | BESIDE |
| FINISHED SIZE (WIDTH) | 297 |
| FINISHED SIZE (HEIGHT) | 420 |
| FINISHED ORIENTATION | BESIDE |
| IMPOSITION (ROW) | 1 |
| IMPOSITION (COLUMN) | 2 |

FIG. 11B

| ITEM | VALUE |
|---|---|
| NAME | A COMPANY : A4 SADDLE STITCH BOOKBINDING |
| PRODUCT TYPE | MANUAL |
| PART | FRONT COVER |
| PROCESS | IMPOSITION |
| PRESETTING | |
| SETTING VALUE ID | 000024 |

F I G. 12A

| ITEM | VALUE |
|---|---|
| SETTING VALUE ID | 000025 |
| OUTPUT SHEET SIZE (WIDTH) | 339 |
| OUTPUT SHEET SIZE (HEIGHT) | 483 |
| ORIENTATION | BESIDE |
| FINISHED SIZE (WIDTH) | 297 |
| FINISHED SIZE (HEIGHT) | 420 |
| FINISHED ORIENTATION | BESIDE |
| IMPOSITION (ROW) | 1 |
| IMPOSITION (COLUMN) | 2 |

F I G. 12B

| ITEM | VALUE |
|---|---|
| NAME | A COMPANY: A4 SADDLE STITCH BOOKBINDING |
| PRODUCT TYPE | MANUAL |
| PART | FRONT COVER |
| PROCESS | IMPOSITION |
| PRESETTING | |
| SETTING VALUE ID | 000025 |

F I G. 12C

| ITEM | VALUE |
|---|---|
| PRESETTING | A4 2UP to A3 AGAIN |
| SETTING VALUE ID | 000026 |

F I G. 12D

| ITEM | VALUE |
|---|---|
| SETTING VALUE ID | 000026 |
| OUTPUT SHEET SIZE (WIDTH) | 339 |
| OUTPUT SHEET SIZE (HEIGHT) | 483 |
| ORIENTATION | BESIDE |
| FINISHED SIZE (WIDTH) | 297 |
| FINISHED SIZE (HEIGHT) | 420 |
| FINISHED ORIENTATION | BESIDE |
| IMPOSITION (ROW) | 1 |
| IMPOSITION (COLUMN) | 2 |

FIG. 13A

| ITEM | VALUE |
|---|---|
| NAME | B COMPANY : FOLDING |
| PRODUCT TYPE | BOOKLET |
| PART | BODY |
| PROCESS | IMPOSITION |
| PRESETTING | A4 2UP to A3 |
| SETTING VALUE ID | |

FIG. 13B

| ITEM | VALUE |
|---|---|
| NAME | B COMPANY : FOLDING |
| PRODUCT TYPE | BOOKLET |
| PART | FRONT COVER |
| PROCESS | IMPOSITION |
| PRESETTING | A4 2UP to A3 |
| SETTING VALUE ID | |

FIG. 13C

| ITEM | VALUE |
|---|---|
| NAME | B COMPANY : FOLDING |
| PRODUCT TYPE | BOOKLET |
| PART | BODY |
| PROCESS | IMPOSITION |
| PRESETTING | A4 2UP to A3 AGAIN |
| SETTING VALUE ID | |

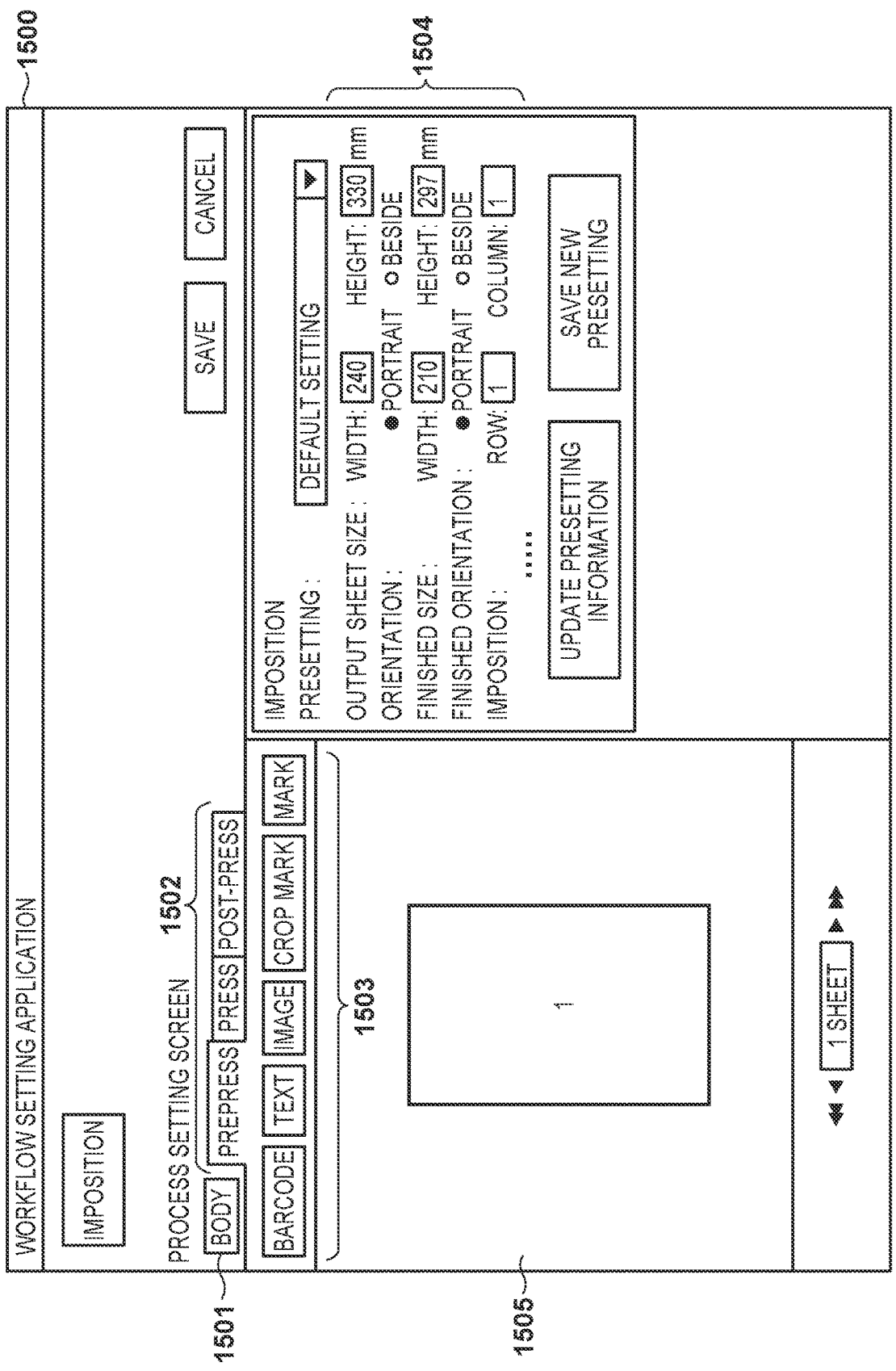

FIG. 16

| SETTING | DEFAULT VALUE |
|---|---|
| OUTPUT SHEET SIZE (WIDTH) | 240 |
| OUTPUT SHEET SIZE (HEIGHT) | 330 |
| ORIENTATION | PORTRAIT |
| FINISHED SIZE (WIDTH) | 210 |
| FINISHED SIZE (HEIGHT) | 297 |
| FINISHED ORIENTATION | PORTRAIT |
| IMPOSITION (ROW) | 1 |
| IMPOSITION (COLUMN) | 1 |

FIG. 17

NEW PRESETTING CREATION

PLEASE INPUT NEWLY DEFINED PRESETTING NAME

PRESETTING NAME :

OK    CANCEL

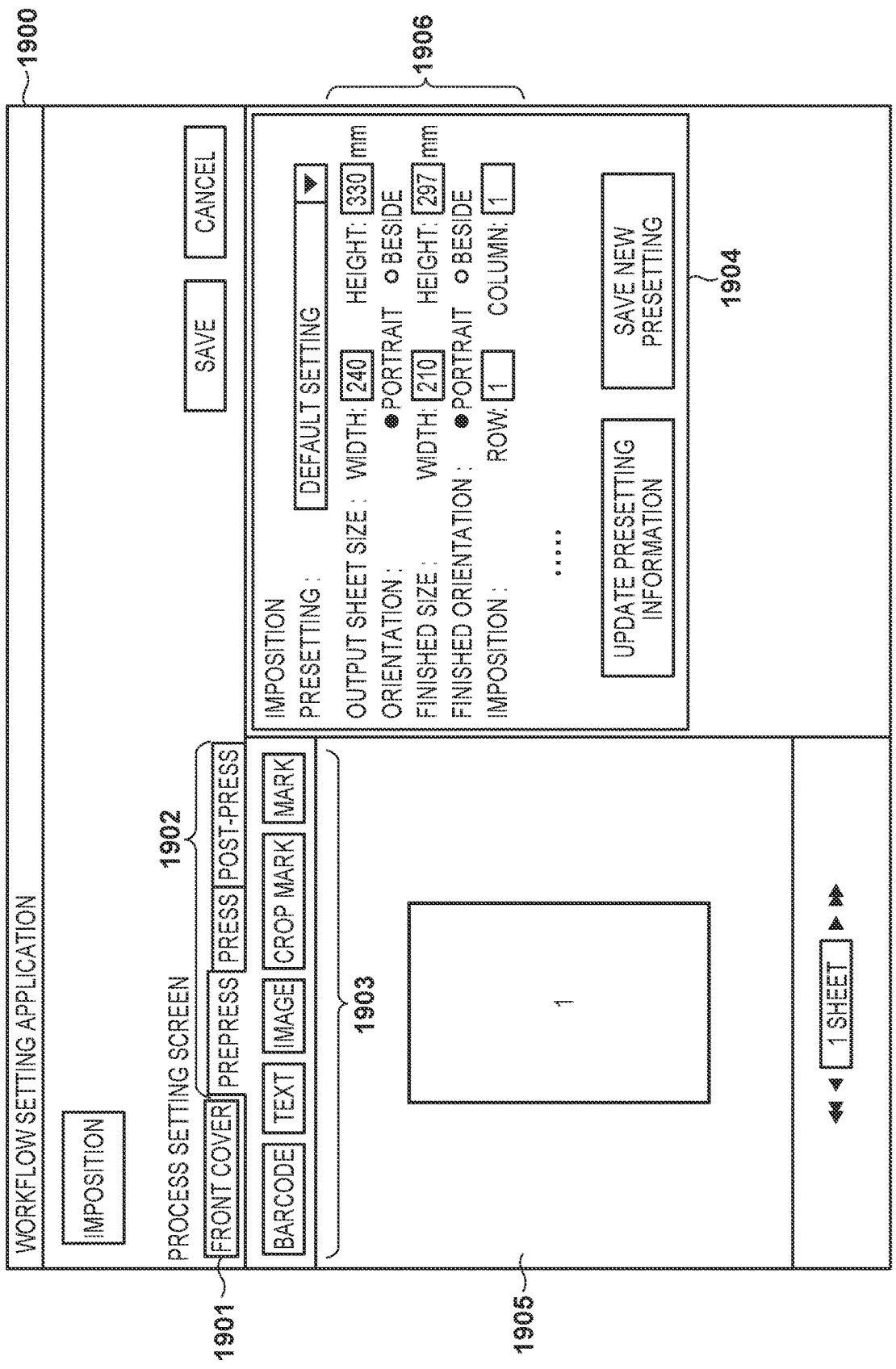

FIG. 25A

CORRECTION APPLICATION RANGE SELECTION (2500)

2501 { A COMPANY : A4 SADDLE STITCH BOOKBINDING
☑ BODY   ☑ FRONT COVER

NEW PRESETTING NAME : [ A4 2UP to A3 AGAIN ] (2502)

[ SELECT ALL ] (2503)   [ APPLY ] (2504)   [ CANCEL ] (2505)

FIG. 25B

CORRECTION APPLICATION RANGE SELECTION (2510)

2511 {
A COMPANY : A4 SADDLE STITCH BOOKBINDING
☑ BODY   ☑ FRONT COVER

A COMPANY : A5 CASE BOOKBINDING
☐ BODY   ☑ FRONT COVER   ☑ JACKET

B COMPANY : A4 SADDLE STITCH BOOKBINDING
☑ BODY   ☐ FRONT COVER   ☐ JACKET

B COMPANY : FOLDING
☑ BODY (2513)   ☐ FRONT COVER (2512)

C COMPANY : POSTCARD DOUBLE-SIDED
☑ BODY

NEW PRESETTING NAME : [ A4 2UP to A3 AGAIN ] (2502)

[ SELECT ALL ] (2503)   [ APPLY ] (2504)   [ CANCEL ] (2505)

FIG. 29A

LIST OF USAGE OF THIS SETTING

SAME SETTING IS BEING USED IN THE FOLLOWING PRODUCTS/PARTS. APPLY DEFINED PRESETTING TO THESE PRODUCTS/PARTS?

2901 { A COMPANY : A4 SADDLE STITCH BOOKBINDING
☑ BODY

2902 APPLY    2903 CANCEL

FIG. 29B

LIST OF USAGE OF THIS SETTING

SAME SETTING IS BEING USED IN THE FOLLOWING PRODUCTS/PARTS. APPLY DEFINED PRESETTING TO THESE PRODUCTS/PARTS?

2911 {
A COMPANY : A4 SADDLE STITCH BOOKBINDING
☑ BODY

A COMPANY : A5 CASE BOOKBINDING
☑ BODY  ☑ FRONT COVER  ☑ JACKET

2902 APPLY    2903 CANCEL

FIG. 30A

| ITEM | VALUE |
|---|---|
| PRESETTING | 2UP |
| SETTING VALUE ID | 000027 |

FIG. 30B

| ITEM | VALUE |
|---|---|
| SETTING VALUE ID | 000027 |
| OUTPUT SHEET SIZE (WIDTH) | 329 |
| OUTPUT SHEET SIZE (HEIGHT) | 483 |
| ORIENTATION | BESIDE |
| FINISHED SIZE (WIDTH) | 297 |
| FINISHED SIZE (HEIGHT) | 420 |
| FINISHED ORIENTATION | BESIDE |
| IMPOSITION (ROW) | 1 |
| IMPOSITION (COLUMN) | 2 |

FIG. 30C

| ITEM | VALUE |
|---|---|
| NAME | A COMPANY : A4 SADDLE STITCH BOOKBINDING |
| PRODUCT TYPE | MANUAL |
| PART | FRONT COVER |
| PROCESS | IMPOSITION |
| PRESETTING | 2UP |
| SETTING VALUE ID | |

FIG. 30D

| ITEM | VALUE |
|---|---|
| NAME | A COMPANY : A4 SADDLE STITCH BOOKBINDING |
| PRODUCT TYPE | MANUAL |
| PART | FRONT COVER |
| PROCESS | IMPOSITION |
| PRESETTING | |
| SETTING VALUE ID | 000027 |

FIG. 30E

| ITEM | VALUE |
|---|---|
| NAME | A COMPANY : A4 SADDLE STITCH BOOKBINDING |
| PRODUCT TYPE | MANUAL |
| PART | BODY |
| PROCESS | IMPOSITION |
| PRESETTING | 2UP |
| SETTING VALUE ID | |

UPDATING SETTING VALUES IN A PRINT PRESETTING AND SELECTIVELY APPLYING THE PRESETTING UPDATES TO PARTS OF PRINT WORKFLOWS

BACKGROUND OF THE INVENTION

Field of the Invention

The present invention relates to an information processing apparatus, a control method thereof, and a non-transitory computer-readable storage medium.

Description of the Related Art

In commercial printing, a part necessary to produce a product and a process necessary for each part are assigned to create a workflow, and a job received at the time of an order is automatically processed. Japanese Patent Laid-Open No. 2005-316904 discloses that an order (workflow generation rule) of a plurality of processes is stored, and the processing order (workflow) is generated based on printing characteristic information of the input order (order). In addition, Japanese Patent Laid-Open No. 2010-97454 discloses that some of the items set by a presetting or user's definitions are changed into other settings, and these settings are stored in different names.

In Japanese Patent Laid-Open No. 2005-316904, a workflow is generated based on a prestored processing order. If this is combined with the technique disclosed in Japanese Patent Laid-Open No. 2010-97454, the settings can be collectively corrected by using a presetting at the time of workflow setting. However, this processing poses a problem that the presetting correction cannot be performed in an appropriate range.

SUMMARY OF THE INVENTION

According to an aspect of the present invention, an information processing apparatus is provided, the apparatus comprising: a setting unit configured to receive designation of a setting value for one or a plurality of parts if a workflow for generating a product formed by one or a plurality of parts is set; a management unit configured to manage, as a setting value for a part, a presetting in which a set of setting values capable of being shared is defined; wherein if a change in a setting value for a part to which a setting is made using a first presetting managed by the managing unit is received, the setting unit further receives designation of a range which reflects the change in the setting value.

According to the present invention, the presetting correction contents and the application range can be correctly set at the time of presetting correction performed in the generation of the workflow in commercial printing.

Further features of the present invention will become apparent from the following description of exemplary embodiments with reference to the attached drawings.

BRIEF DESCRIPTION OF THE DRAWINGS

FIGS. 7A and 7B are views showing the arrangement examples of the workflow editing screens according to this embodiment;

FIG. 9 is a view showing the arrangement example of a workflow information table according to this embodiment;

FIGS. 10A, 10B, 10C, and 10D are views showing the arrangement examples of the respective tables according to this embodiment;

FIGS. 11A and 11B are views showing the arrangement examples of the respective tables according to this embodiment;

FIGS. 12A, 12B, 12C, and 12D are views showing the arrangement examples of the respective tables according to this embodiment;

FIGS. 13A, 13B, and 13C are views showing the arrangement examples of the respective tables according to this embodiment;

FIGS. 15A and 15B are views showing the arrangement examples of an imposition setting UI screen according to this embodiment;

FIG. 16 is a view showing the arrangement example of a default value information table according to this embodiment;

FIG. 17 is a view showing the arrangement example of a dialog for new presetting creation according to this embodiment;

FIGS. 19A and 19B are views showing the arrangement examples of an imposition setting UI screen according to this embodiment;

FIGS. 25A and 25B are views showing the arrangement examples of the presetting correction application range selection dialog according to this embodiment;

FIGS. 29A and 29B are views showing the arrangement examples of a setting use range selection dialog for setting according to the second embodiment; and FIGS. 30A, 30B, 30C, 30D, and 30E are views showing the arrangement examples of the respective tables according to the second embodiment.

DESCRIPTION OF THE EMBODIMENTS

Figure 1:
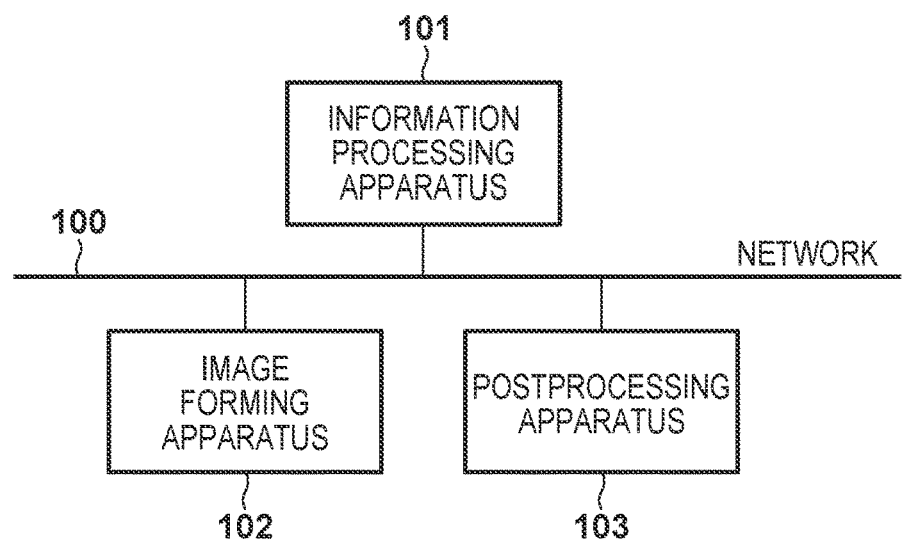
FIG. 1 is a block diagram showing an example of a system arrangement according to a first embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

[System Arrangement]

FIG. 1 is a block diagram showing the arrangement example of a system according to an embodiment of the present invention. The system arrangement according to this embodiment includes an information processing apparatus 101, an image forming apparatus 102, and a postprocessing apparatus 103. The information processing apparatus 101, the image forming apparatus 102, and the postprocessing apparatus 103 are communicably connected to each other via a network 100.

The image forming apparatus 102 analyzes print data transmitted from the information processing apparatus 101 and the like, converts it into a dot image of each page, and prints it. The printing method of the image forming apparatus 102 is not limited to a specific one. A printed material output from the image forming apparatus 102 can be transferred to the postprocessing apparatus 103 by the operator's hand carrying or transferred to the postprocessing apparatus 103 via a belt conveyor (not shown). The postprocessing apparatus 103 performs postprocesses such as cutting, creasing, folding, bookbinding, and perfect binding for a transferred printed material. A plurality of postprocessing apparatuses may be used to cut the materials having undergone bookbinding to produce a plurality of booklets.

Note that in FIG. 1, one information processing apparatus 101, one image forming apparatus 102, and one postprocessing apparatus 103 are illustrated, but the number of apparatuses is arbitrary. For example, the printed materials output from the plurality of image forming apparatuses 102 may be processed by the plurality of postprocessing apparatuses 103. In addition, the network 100 may use a plurality of communication methods regardless of wired and wireless communication methods.

[Hardware Arrangement]

Figure 2:
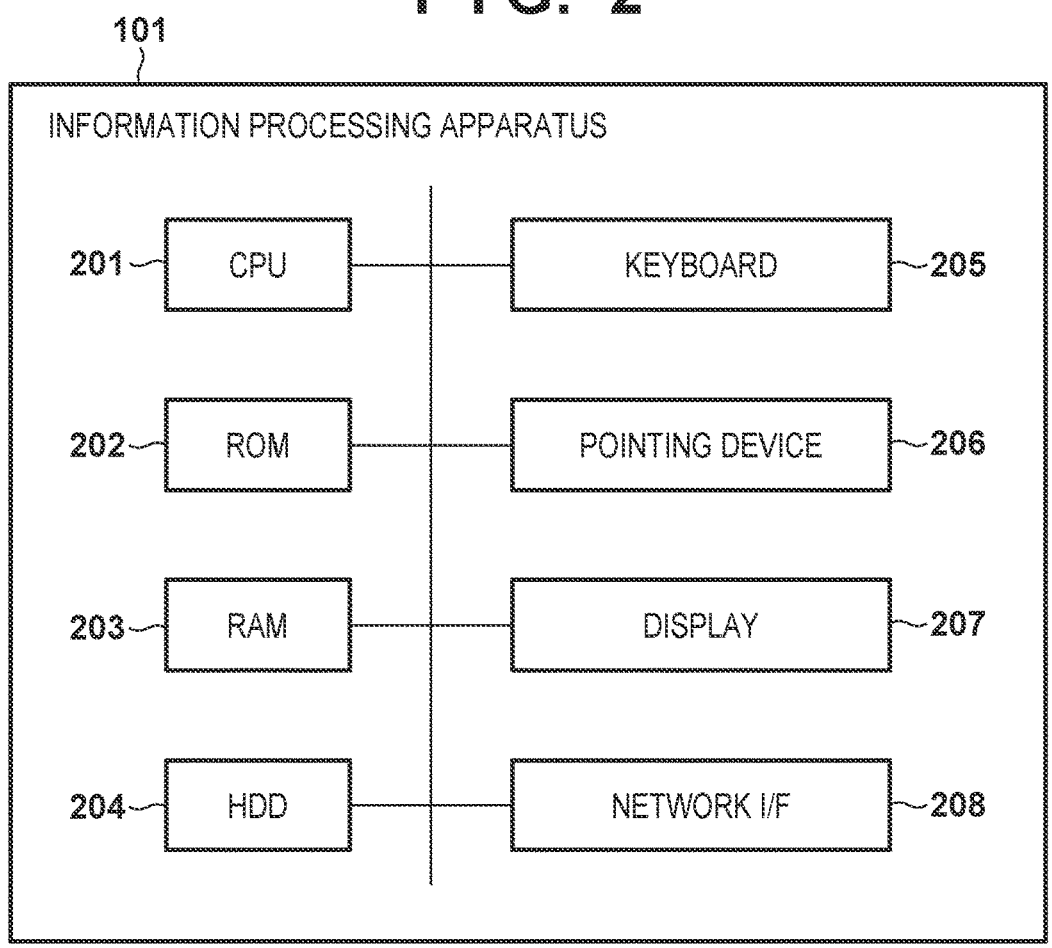
FIG. 2 is a block diagram showing an example of the hardware arrangement of an information processing apparatus according to this embodiment.

FIG. 2 is a block diagram showing an example of the hardware arrangement of the information processing apparatus 101 according to this embodiment. A CPU (Central Processing Unit) 201 reads out and executes various kinds of control programs stored in a ROM (Read Only Memory) 202 and executes various kinds of control processes corresponding to these programs. A RAM (Random Access Memory) 203 is used as a temporary storage area such as a main memory or a work memory in the CPU 201. An HD (Hard Disc Drive) 204 stores image data and various kinds of programs. A keyboard 205 is an input device serving as an instruction input means and instructs a control command instruction and a text input to an application of this embodiment. A pointing device 206 is an input device serving as an instruction input means together with the keyboard 205 and instructs a control command instruction to an application of this embodiment.

A display 207 is an output device serving as a display means and displays commands input from the keyboard 205 and the pointing device 206 and a state of an application of this embodiment. A network I/F 208 is an interface for connecting the information processing apparatus 101 to a network (a LAN (Local Area Network) and the Internet). The information processing apparatus 101 exchanges various kinds of information with other apparatuses on the network by using the network I/F 208. Note that the hardware arrangement shown in FIG. 2 is merely an example, and other units may be arranged.

Figure 3:
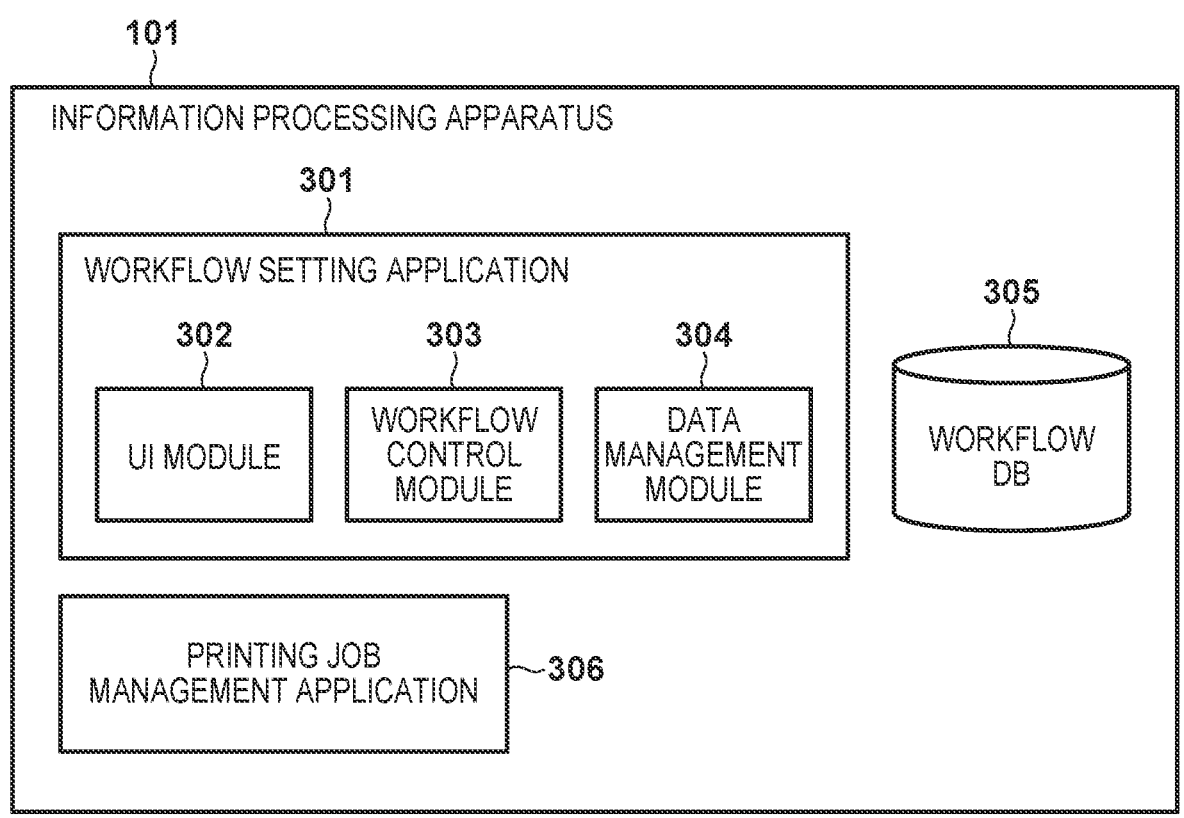
FIG. 3 is a block diagram showing an example of the software arrangement of the information processing apparatus according to this embodiment.

FIG. 3 is a block diagram showing an example of the software arrangement of the information processing apparatus 101 according to this embodiment. A workflow setting application 301 is a program module installed and operated in the information processing apparatus 101. The workflow setting application 301 is loaded into the RAM 203 when it is to be executed. The workflow setting apparatus 301 is executed by the CPU 201. The workflow setting application 301 includes a UI module 302, a workflow control module 303, and a data management module 304. The UI module 302 constructs a GUI (Graphical User Interface) and receives various kinds of input operations from the user to instruct execution of processes. The workflow control module 303 executes various kinds of processes (creation, editing, and registration of a workflow) of the workflow setting application 301. The data management module 304 accesses a workflow database (DB) 305 (to be described later) and executes reference to various kinds of information about the UI and the workflow control.

Products targeted by the workflow setting application 301 according to this embodiment are enumerated as a book, a leaflet, and a name card. The workflow setting application 301 assigns parts (for example, a front cover, a body, an inside page, and a book band) necessary for producing these products and the processes (for example, an imposition process, a barcode adding process, a printing process, a folding process, a perfect binding process, a three-side trimmer process) to the workflow.

The workflow DB 305 is a database for managing a UI and workflow control information to be described later. The workflow DB 305 can have not only an arrangement for storing information in the HDD 204 of the information processing apparatus 101 but also an arrangement as a storage destination of another information processing apparatus (for example, a database server) connected via the network 100.

A printing job management application 306 is a program module installed and operated in the information processing apparatus 101. The printing job management application 306 receives an order of a printed material from the user via an order system (not shown), obtains the workflow information registered in the workflow DB 305 by the workflow setting application 301, and generates a print job corresponding to the order. After that, the printing job management application 306 transmits the generated printing job to the predetermined image forming apparatus 102 and the predetermined postprocessing apparatus 103. Note that the printing job management application 306 and the workflow setting application 301 may be integrated into one application. Alternatively, the printing job management application 306 and the workflow setting application 301 may be installed in different information processing apparatuses 101.

[Workflow Creation]

Figure 4:
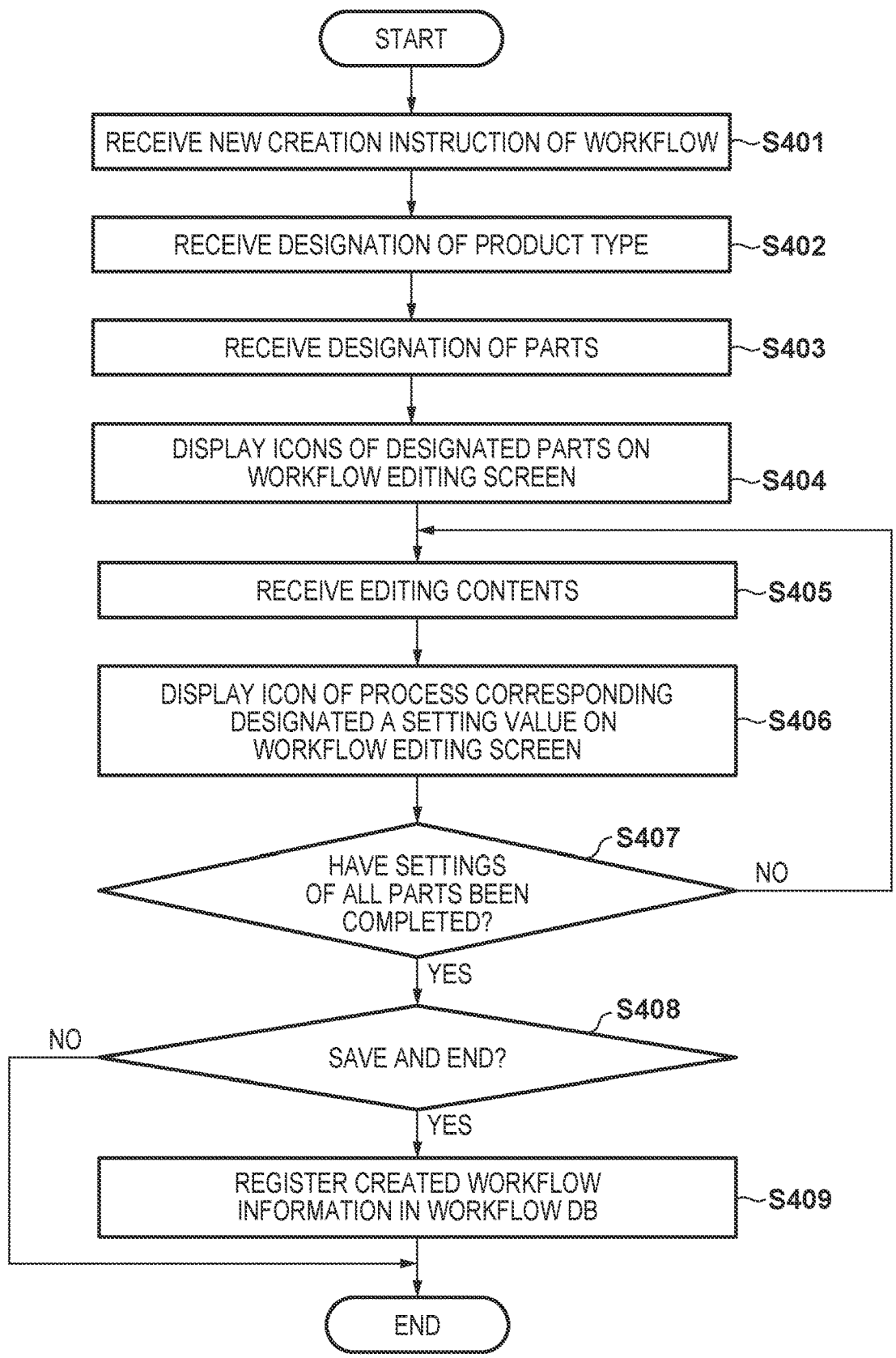
FIG. 4 is a flowchart of the workflow setting and registration process according to this embodiment.

The workflow creation process according to this embodiment will be described below. FIG. 4 is a flowchart showing a workflow setting and registration process of the workflow setting application 301. As described above, the workflow setting application 301 is operated by being read out and executed by the CPU 201 of the information processing apparatus 101.

Figures 5, 6:
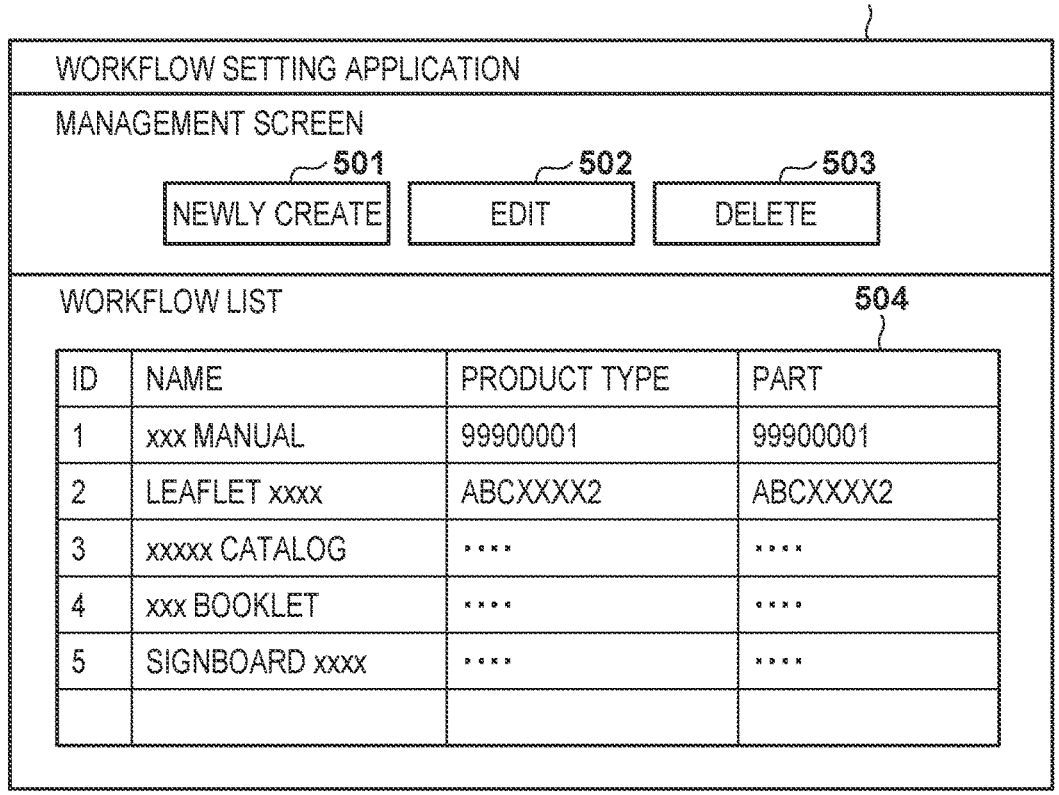
FIG. 5 is a view showing the arrangement example of a workflow management screen according to this embodiment.
FIG. 6 is a view showing the arrangement example of a new creation screen according to this embodiment.

In step S401, the workflow setting application 301 receives a new creation instruction of a workflow and displays a new creation screen. FIG. 5 shows an example of a workflow management screen 500 of the workflow setting application 301. If the user instructs execution of an execution file (not shown) of the workflow setting application 301, the program of the workflow setting application 301 is loaded into the RAM 203 and started. The UI module 302 displays the workflow management screen 500 on the display 207.

The workflow management screen 500 includes a new creation button 501, an editing button 502, a deletion button 503, and a workflow list 504. The workflow information registered in the workflow DB 305 is displayed on the workflow list 504. If the UI module 302 receives that the user has pressed the new creation button 501 using the keyboard 205 or the pointing device 206, the UI module 302 instructs a new creation process to the workflow control module 303. After that, the workflow control module 303 displays a new creation screen 600 on the display 207 via the UI module 302.

In step S402, the workflow setting application 301 receives designation of a product type on the new creation screen 600. FIG. 6 shows an example of the new creation screen 600 of the workflow setting application 301. The new creation screen 600 includes controls for setting a name 601, a product type 602, and parts 603. In addition, the new creation screen 600 also includes an OK button 604 for instructing execution of new creation of a workflow by the contents set using the controls, and a cancel button 605 for canceling an instruction.

The name 601 represents a text box for setting an arbitrary name for identifying a workflow to be created. The product type 602 represents a list box for setting a product type predefined by the workflow setting application 301. For example, as a product type, the type of product such as a book, a manual, or a name card is listed. The product type is not limited to a specific one. For example, another type may be set in accordance with a bookbinding product creatable by the image forming apparatus 102 or the post-processing apparatus 103. Parts 603 represent list boxes for setting parts constituting a product. The number of parts is at least one, and the user can increase/decrease the number of parts as needed. If the UI module 302 receives that the user has designated the product type 602 using the keyboard 205 and the pointing device 206, the UI module 302 sets the designated product type. The process then advances to step S403.

In step S403, the workflow setting application 301 receives designation of parts on the new creation screen 600. The parts 603 represent the list boxes for setting parts such as a front cover, a body, an inside page, and a book band constituting a product can set a plurality of parts depending on a product to be produced. FIG. 6 shows a state in which four parts of the front cover, the body, the inside page, and the book hand are set. When the UI module 302 receives that the user designates the parts 603 using the keyboard 205 and the pointing device 206 and presses the OK button 604 of the new creation screen 600, the UI module 302 sets the designated parts, and the process advances to step S404.

In step S404, the workflow setting application 301 displays the icon images corresponding to the parts set in step S403 on a workflow editing screen 700. FIG. 7A shows an example of the workflow editing screen 700. The workflow editing screen 700 includes a save button 701 for saving the edited workflow in the workflow DB 305, a cancel button 702 for canceling editing of the workflow, and a workflow area 703. The workflow area 703 is an area for displaying the edited registered workflow. The workflow area 703 displays part icons 704 indicating the set parts and connected process icons 705 indicating the workflow of each part. In the example of FIG. 7A, "imposition" indicating the imposition process, "barcode" indicating the barcode adding process, "register marking" indicating the crop mark adding process, "printing" indicating the printing process, "perfect binding" indicating the perfect binding process, "three-way cutting" indicating the three-side trimmer process, and "cutting & creasing" indicating the cutting and creasing process are connected and displayed. Note that the processes shown in FIG. 7A are merely an example and may define other processes.

In step S404, the UI module 302 displays the icon images corresponding to the parts set in step S403 on the workflow area 703. For example, when the front cover, the body, the inside page, and the book band are set, the four icon images corresponding to the four parts are displayed. FIG. 7B shows the workflow editing screen 700 in a state in which a workflow is newly created on the new creation screen 600. That is, when a new workflow is newly created, FIG. 7B shows the state in which only icons (a front cover 706, a body 707, an inside page 708, and a book band 709) indicating the parts are displayed.

Figure 8:
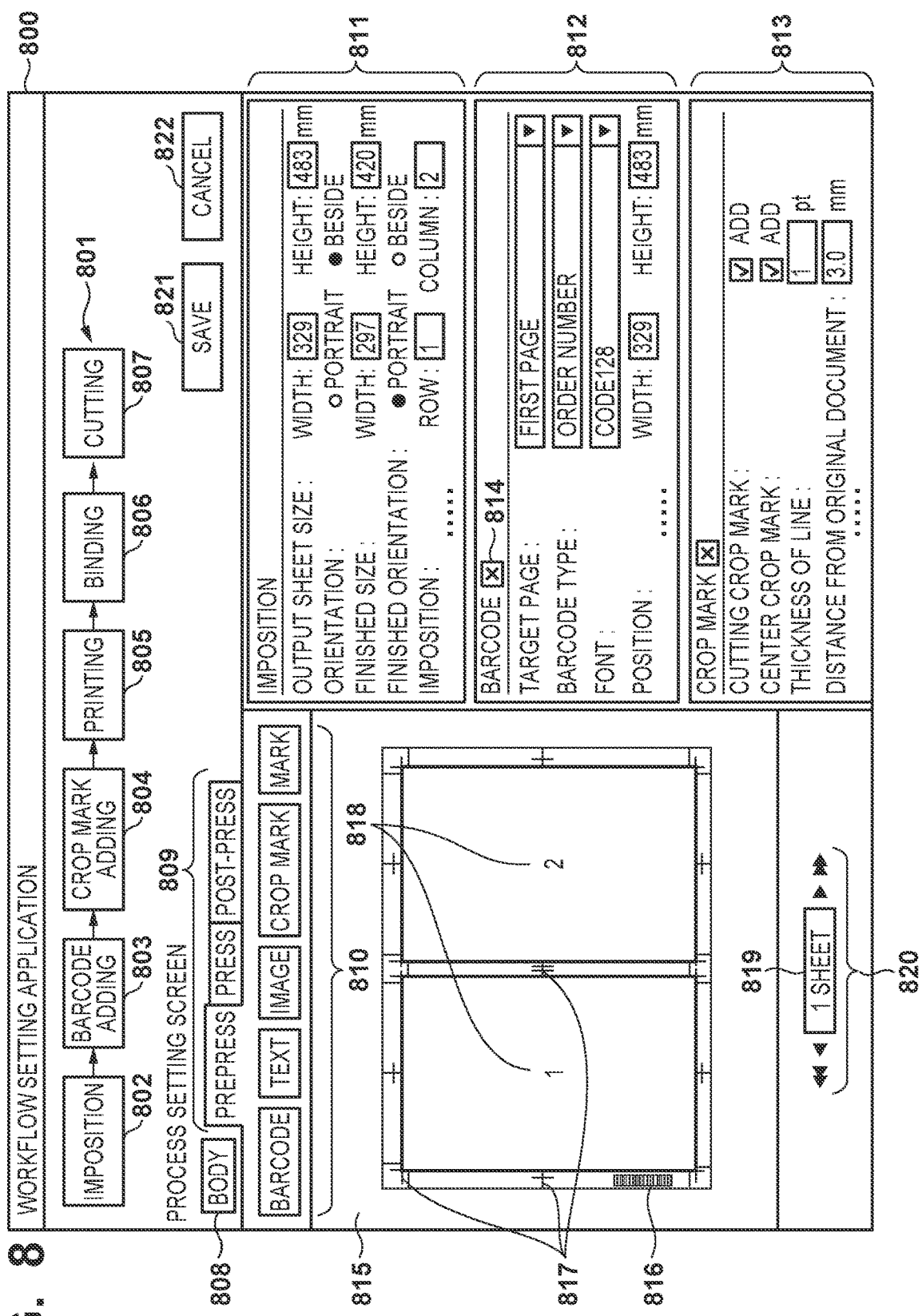
FIG. 8 is a view showing the arrangement example of a workflow process setting screen according to this embodiment.

In step S405, the workflow setting application 301 receives various kinds of editing operations from the user on a workflow process setting screen. FIG. 8 shows an example of a workflow process setting screen 800. Process icons 801 indicate a series of icons expressing a workflow set in the setting target part. An icon 802 is an icon indicating that the imposition process is set. An icon 803 is an icon indicating that the barcode adding process is set. An icon 804 is an icon indicating that the crop mark adding process is set. An icon 805 is an icon indicating that the printing process is set. An icon 806 is an icon indicating that the perfect binding process is set. An icon 807 is an icon indicating that the three-side trimmer process is set.

A label control 808 indicates a control indicating a part as a setting target. Tab controls 809 indicate controls for setting the category processes of prepress, press, and post-press. For example, if the prepress tab is selected, various kinds of setting controls for setting the prepress category processes are displayed. Process setting buttons 810 indicate setting buttons for setting various kinds of processes. Out of the tab controls 809, if the prepress tab is displayed, the process setting buttons such as a barcode, a text, an image, a crop mark, and a mark settable in the prepress category are displayed.

Detail setting controls 811, 812, and 813 indicate controls for setting the details of the respective processes and are controls for setting the imposition process, the barcode adding process, and the crop mark adding process, respectively. For example, controls for setting an output sheet size and a finished size are further displayed in the detail setting controls 811. A process deletion button 814 can release the set process.

A preview area 815 displays the preview of a printed material on which the values set in the respective setting controls are reflected. A preview image 816 shows a barcode layout image. Preview images 817 indicate the layout images of the crop marks. Preview images 818 indicate blank page data in which only page numbers are arranged.

A sheet number 819 indicates a sheet number displayed in the preview area 815. Page movement buttons 820 indicate buttons for changing the sheet number displayed on the preview area 815. A save button 821 is a button for saving the contents set on the workflow process setting screen 800. A cancel button 822 is a button for canceling the contents set on the workflow process setting screen 800. When each of these buttons is pressed, the screen returns to the workflow editing screen 700.

The UI module 302 displays the workflow process setting screen 800 corresponding to the selected part on the display 207. For example, if the "front cover" part is selected, the workflow process setting screen 800 for setting the "front cover" is displayed. In a state in which a part is newly created, no process is set. For this reason, the initial state of the workflow process setting screen 800 may display a state in which no process is set (the process icons 801 are empty). Alternatively, the workflow process setting screen 800 may be displayed in a state in which the imposition process is set with a default value if the imposition process is an indispensable process. The applied setting value is temporarily stored in the RAM 203.

When the user selects or clicks any one of the controls constituting the workflow process setting screen 800 by using the pointing device 206, the UI module 302 receives each kind of editing operation.

In step S407, the workflow setting application 301 determines whether the workflow process settings corresponding to all the parts have been completed. If it is detected that the user presses the save button 701 or the cancel button 702, the workflow control module 303 determines that the workflow editing ends; otherwise (NO in step S407), the process returns to step S405. If it is determined that the workflow editing ends (YES in step S407), the process advances to step S408.

In step S408, the workflow setting application 301 determines whether that the save button 701 is pressed at the end time. If the end is made by the save button 701 (YES in step S408), the process advances to step S409. If the end is made by the cancel button 702 (NO in step S408), the editing contents are discarded, and the processing of this flowchart ends.

In step S409, the workflow setting application 301 stores the setting contents of the set workflow process as the workflow information in the workflow DB 305. FIG. 9 shows an example of a workflow information table 900. FIGS. 10C and 10D show examples of part and process information tables referred to from the workflow information table 900. By these information tables, the workflow information is managed. The workflow information table 900 in FIG. 9 stores an ID (identification information) for uniquely identifying a workflow, and name information, product type information, and part information which are set on the new creation screen 600. The ID for uniquely identifying the workflow is automatically set by the system. FIG. 10C shows the part and process information table of the body part. FIG. 10D shows the part and process information table of the front cover part. The part and process information tables will be described later.

In step S409, the workflow control module 303 converts, into formats indicated in FIGS. 9, 10C, and 10D via the data management module 304, the workflow setting values temporarily stored in the RAM 203, and stores the converted formats as the workflow information in the workflow DB 305. After the end of this process, this flowchart ends.

Note that the preordered contents may be linked with the ID for uniquely identifying the workflow in FIG. 9 and defined on the side of an order system (not shown) for inputting an order to the printing job management application 306. With this arrangement, in accordance with the settings of the workflow set in the workflow setting application 301, it is possible to generate a printing job corresponding to the order received by the order system.

[Presetting]

A presetting according to this embodiment will then be described. The presetting indicates one or a plurality of sets of setting values commonly usable for the predefined workflow setting part/process. By using the presetting, the same settings can be easily input for other parts or other products. Advantageously, the settings can be collectively reflected at the time of correction.

(Presetting Definition)

Figure 14:
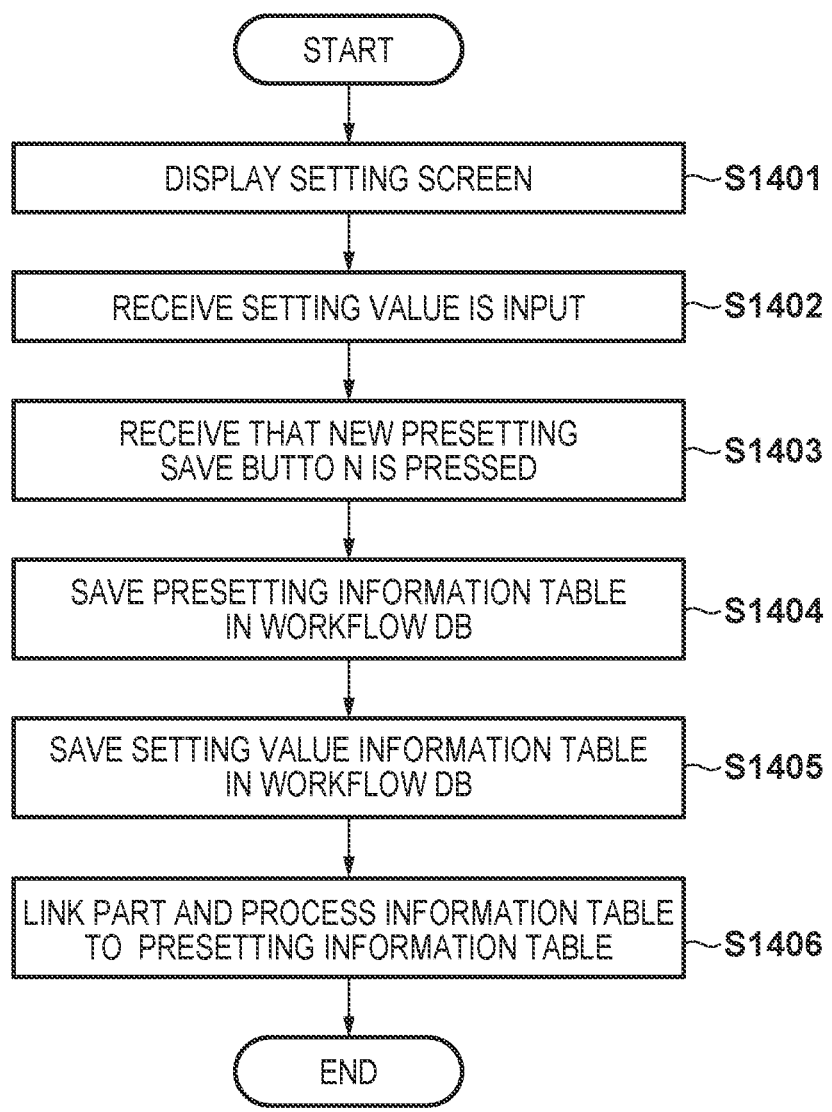
FIG. 14 is a flowchart of a presetting definition process according to this embodiment.

FIG. 14 is a flowchart showing processing for defining presetting according to this embodiment. This flowchart is executed, for example, when the CPU 201 of the information processing apparatus 101 reads out and executes the program of the workflow setting application 301.

In step S1401, the workflow setting application 301 displays a setting screen. FIG. 15A shows the arrangement example of a workflow process setting screen 1500 for imposition setting in the body part prepress process. A label control 1501 indicates an editing target part. In this case, the body is a target. Tab controls 1502 are tab controls for designating an editing target process from a prepress (imposition), press (printing), and post-press (postprocess) as the setting target processes in the workflow. In this case, the process indicates a state of prepress editing. Process setting buttons 1503 are buttons for setting various kinds of processes. In a state in which the prepress tab control is selected, process setting buttons corresponding to the barcode adding, the text, the image, the crop mark, and the mark are displayed.

Detail setting controls 1504 are setting controls for setting the detail setting of imposition. The default values of the respective setting items shown in the detail setting controls 1504 are obtained from a default value information table 1600 determined in accordance with the parts shown in FIG. 16. Examples of the setting items shown in the detail setting controls 1504 are an output sheet size (width), an output sheet size (height), an orientation, a finished size (width), a finished size (height), a finished orientation, imposition (row), and imposition (column). The settings of the default value information table 1600 are items of the detail setting controls 1504, and the default values are defined for each part. The default value information table 1600 is stored in the workflow DB 305. The data management module 304 refers to the default value information table 1600, and this value is transferred to the UI module 302 and displayed. The preview image of the designated page is displayed in the preview area 1505.

Figure 15B:
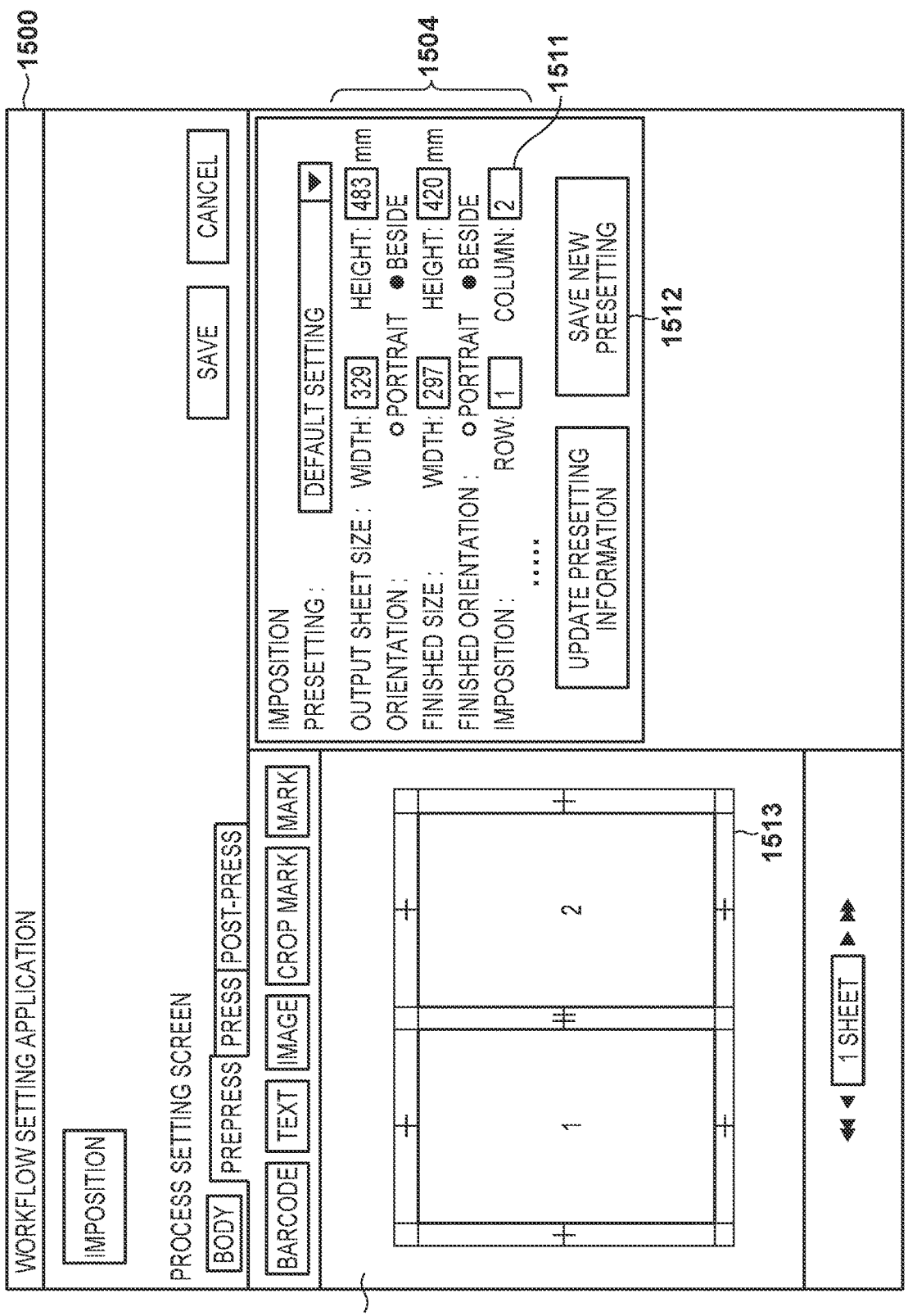

In step S1402, the workflow setting application 301 receives that the setting value is input. FIG. 15B shows the display example of the workflow process setting screen 1500 of the imposition setting in the body part prepress process.

In this case, in the imposition detail setting controls 1504, the column value is changed from "1" to "2". In accordance with this, the settings of the output sheet size, the orientation, the finished size, and the finished orientation are changed. In accordance with the above setting change, the display in a preview area 1505 is made as 2-up impositions like a preview image 1513.

In step S1403, the workflow setting application 301 receives that the user presses a new presetting save button 1512 of the workflow process setting screen 1500. In response to this, the workflow setting application 301 displays a dialog 1700 for new presetting creation shown in FIG. 17 and receives the input of a presetting name in a presetting name 1701. In addition, when an OK button 1702 is pressed, the workflow setting application 301 advances the process to step S1404.

In step S1404, the workflow setting application 301 saves, in the workflow DB 305, the presetting information table corresponding to the newly created presetting. FIG. 10A is a view showing an example of a presetting information table. The presetting information table includes two items, that is, "presetting" and "setting value ID". "Presetting" corresponds to the presetting name, and the value input in the presetting name 1701 in step S1403 is stored. "Setting value ID" is a value uniquely determined for the setting value. The presetting information table is transferred from the UI module 302 to the data management module 304, and the data management module 304 stores the table in the workflow DB 305.

In step S1405, the workflow setting application 301 saves the setting value information table in the workflow DB 305. Each setting item of the detail setting control 1504 is saved in the setting value information table shown in FIG. 10B and is linked by the presetting information table and the "setting value ID". The setting item of the setting value information table in FIG. 10B corresponds to the detail setting control 1504 and is constituted by the output sheet size (width), the output sheet size (height), the orientation, the finished size (width), the finished size (height), the finished orientation, the imposition (row), and the imposition (column). The setting information table is also transferred from the UI module 302 to the data management module 304, and the data management module 304 stores the table in the workflow DB 305.

In step S1406, the workflow setting application 301 links the part and process information table to the presetting information table. The presetting name is written in the "presetting" item of the part and process information table shown in FIG. 10C. The item is linked with the "presetting" item of the presetting information table shown in FIG. 10A. The name information, product type information, part information, process information, presetting information, and setting value ID information are stored in the part and process information table. The "name" and "part") of the part and process information table are linked with the name and each part (part 1, part 2, part 3, and part 4) of the workflow information table 900 in FIG. 9. For this reason, these pieces of information play a rule to associate the presetting information table (FIG. 10A), the setting value information table (FIG. 10B), and the workflow information table 900 (FIG. 9). The part and process information table is transferred from the UI module 302 to the data management module 304, and the data management module 304 stores the table in the workflow DB 305. This flowchart then ends.

(Use of Presetting)

The sequence of use of the defined presetting in other parts and processes will be described below. A case in which the "A4 2UP to A3" presetting defined in the process of the "body" part and the "imposition" process in the above description is used for the "front cover" part and the "imposition" part of the same workflow will be illustrated.

Figure 18:
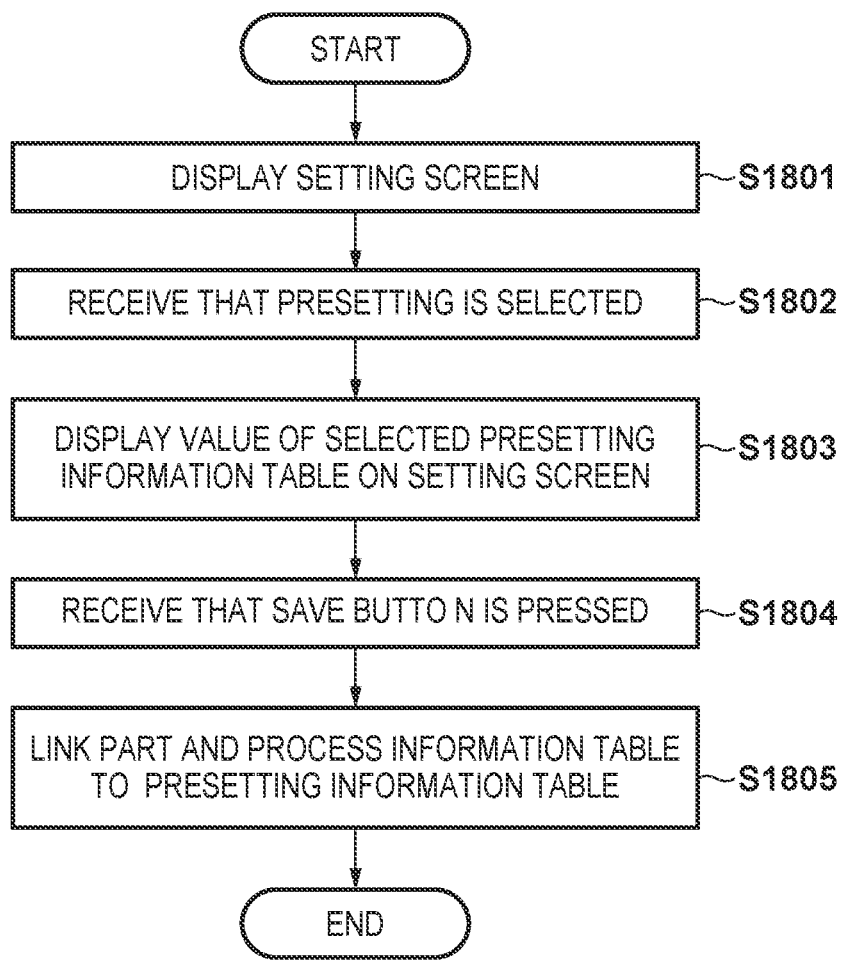
FIG. 18 is a flowchart of a presetting use process according to this embodiment.

FIG. 18 is a flowchart showing the process using the presetting. This flowchart is implemented when the CPU 201 of the information processing apparatus 101 reads out and executes the program of the workflow setting application 301.

In step S1801, the workflow setting application 301 displays a setting screen. FIG. 19A shows the arrangement example of a workflow process setting screen 1900 of the imposition setting in the front cover part prepress process. A label control 1901 indicates an editing target part. In this case, the front cover is a target. Controls 1902 to 1904 are the same as the controls 1502 to 1504 shown in FIGS. 15A and 15B. The default values of setting items 1906 included in the detail setting controls 1904 are obtained from the default value information table 1600 determined in accordance with the products for each part shown in FIG. 16.

Figure 19B:
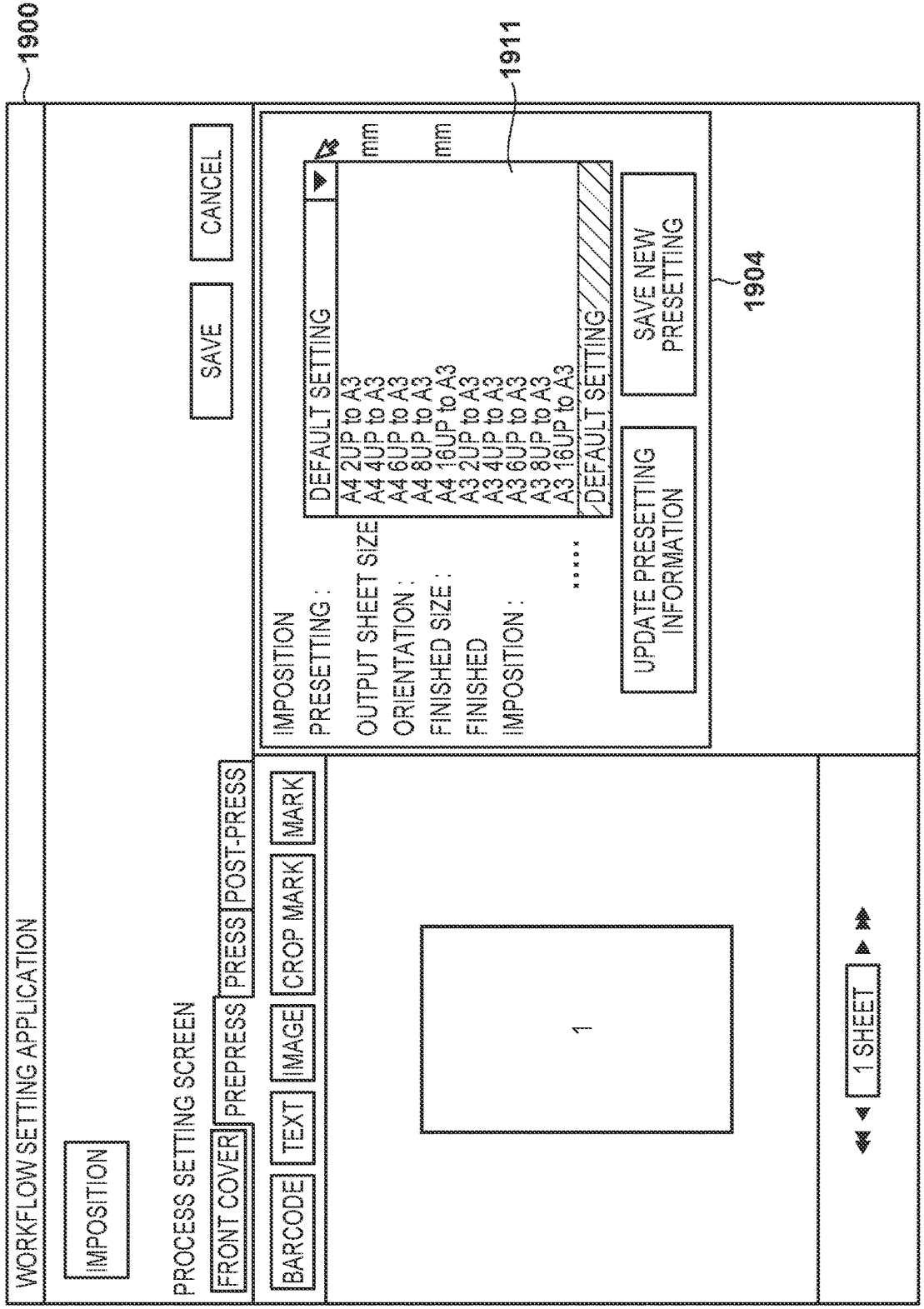

In step S1802, the workflow setting application 301 receives that the presetting is selected. FIG. 19B shows an example in which a pull-down list 1911 for selecting the presetting is displayed on the workflow process setting screen 1900. The pull-down list 1911 is displayed using the setting items of the presetting of the detail setting controls 1904 corresponding to the imposition. The presetting saved in step S1404 of FIG. 14 is included in the pull-down list 1911. The list information of the presetting is obtained by making the data management module 304 access the workflow DB 305 and referring to the presetting information table and the part and process information table. Out of these pieces of information, the presetting name matching with the corresponding process is transferred to the UI module 302 and is added to the list item as a display target.

Figure 20:
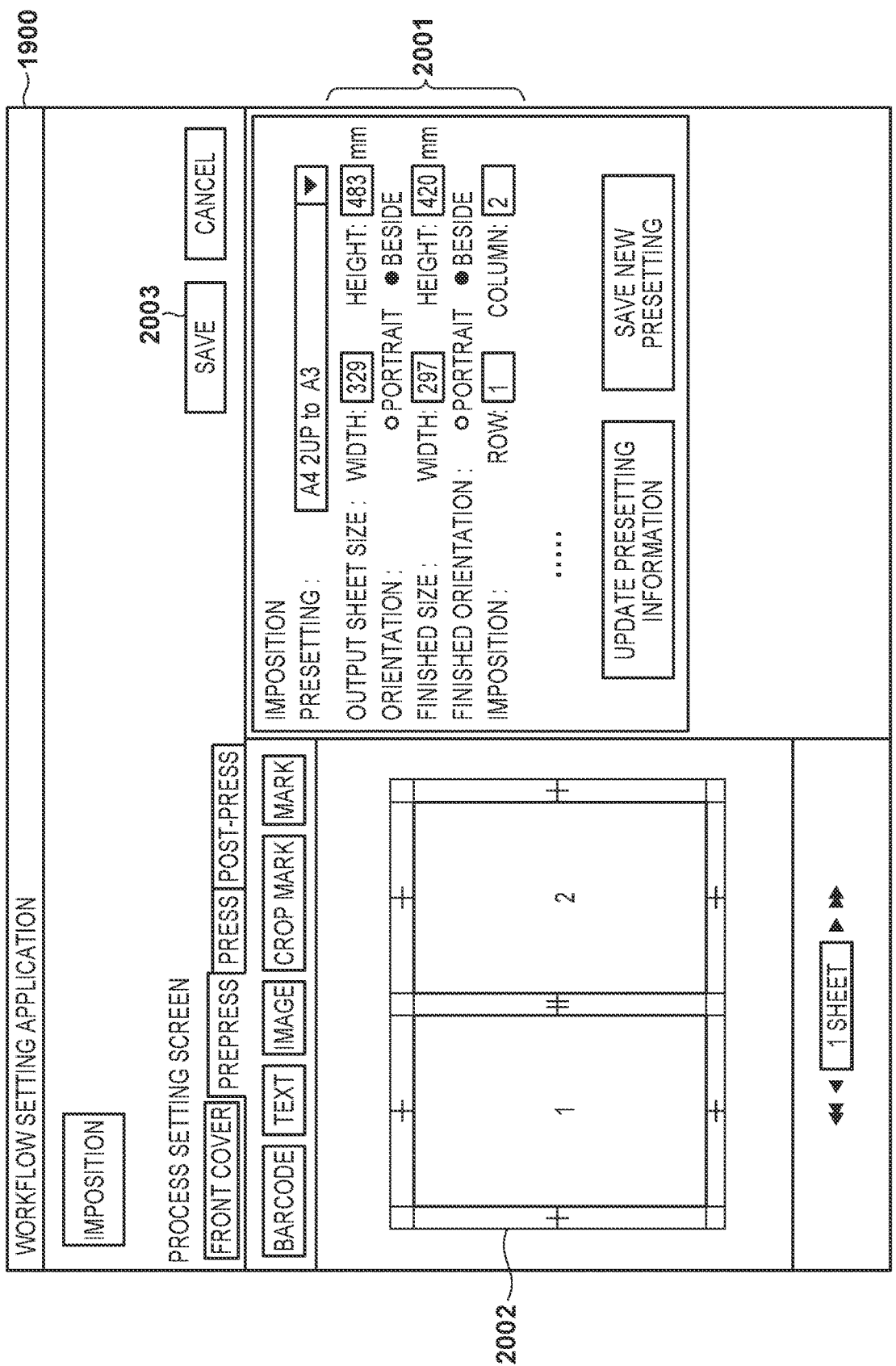
FIG. 20 is a view showing the arrangement example of an imposition setting UI screen according to this embodiment.

In step S1803, the workflow setting application 301 displays the value of the presetting value information table of the selected presetting (A4 2UP to A3) on the workflow process setting screen 1900. The presetting value information table (FIG. 10A) is stored in the workflow DB 305 and read out by the data management module 304. Similarly, the data management module 304 reads out the setting value information table (FIG. 10B) linked with the setting value ID stored in the workflow DB 305 and transfers it to the UI module 302. The UI module 302 sets the value obtained from the setting value information table in each setting item of the workflow process setting screen 1900. FIG. 20 shows the display example of the workflow process setting screen 1900 after each setting item is set. In FIG. 20, the values of setting items 2001 are values corresponding to the selected presetting. At this time, the contents of a preview area 2002 are also updated.

In step S1804, the workflow setting application 301 receives that a save button 2003 in the workflow process setting screen 1900 is pressed. In response to this, the process advances to step S1805.

In step S1805, the workflow setting application 301 links the presetting value information table with the part and process information table. When the presetting is set, the presetting name "A4 2UP to A3" is written in the "presetting" item of the part and process information table as shown in FIG. 10D. On the other hand, the setting value ID is set blank (NULL). When "A4 2UP to A3" is set in the "presetting" item, the presetting information table in FIG. 10A defined in step S1404 of FIG. 14 is linked with the setting value information table in FIG. 10B. In this manner, the body part and the front page part are linked with the presetting information table. The part and process information table is transferred from the UI module 302 to the data management module 304. The data management module 304 stores the part and process information table in the workflow DB 305. This flowchart ends.

On the other hand, if the presetting is not set, that is, if the save button 2003 is pressed in the blank state of the "presetting" item in FIG. 20, the setting value information table and the part and process information table shown in FIGS. 11A and 11B are stored in the workflow DB 305. Since the "presetting" item of the part and process information table is not set, this value is empty (NULL). The setting value information table (FIG. 11A) of a new setting value ID is created and is linked with the part and process information table. The new setting value ID is "000024". In this case, the presetting information table (FIG. 10A) is linked with the part and process information table (FIG. 11B).

In the above description, a case in which the presetting defined in the same workflow is used in the same workflow has been described above. However, the present invention is not limited to this. This presetting may be used in another workflow.

(Correction of Presetting)

Figure 21:
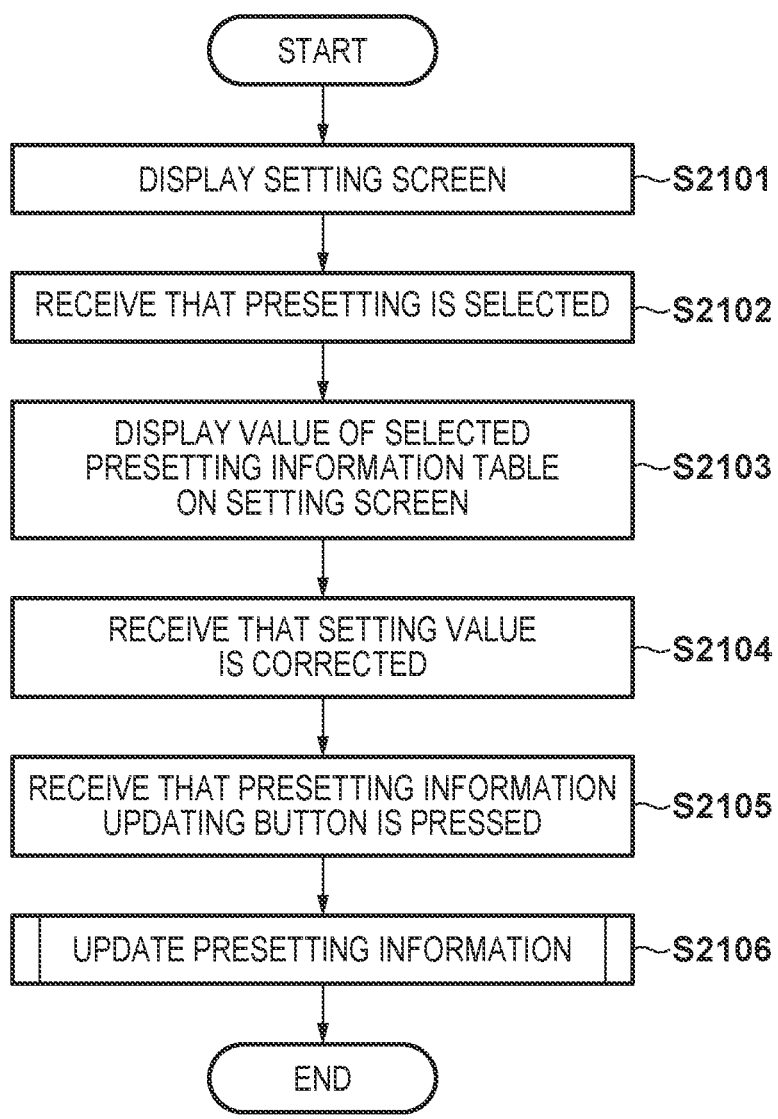
FIG. 21 is a flowchart of presetting correction process according to this embodiment.

FIG. 21 is a flowchart showing processing for correcting the presetting of the workflow setting application 301. This flowchart is implemented when the CPU 201 of the information processing apparatus 101 reads out and executes the program of the workflow setting application 301. Processes in steps S2101 to S2103 are the same as in steps S1801 to S1803 shown in FIG. 18, and a detailed description thereof will be omitted.

Figure 22:
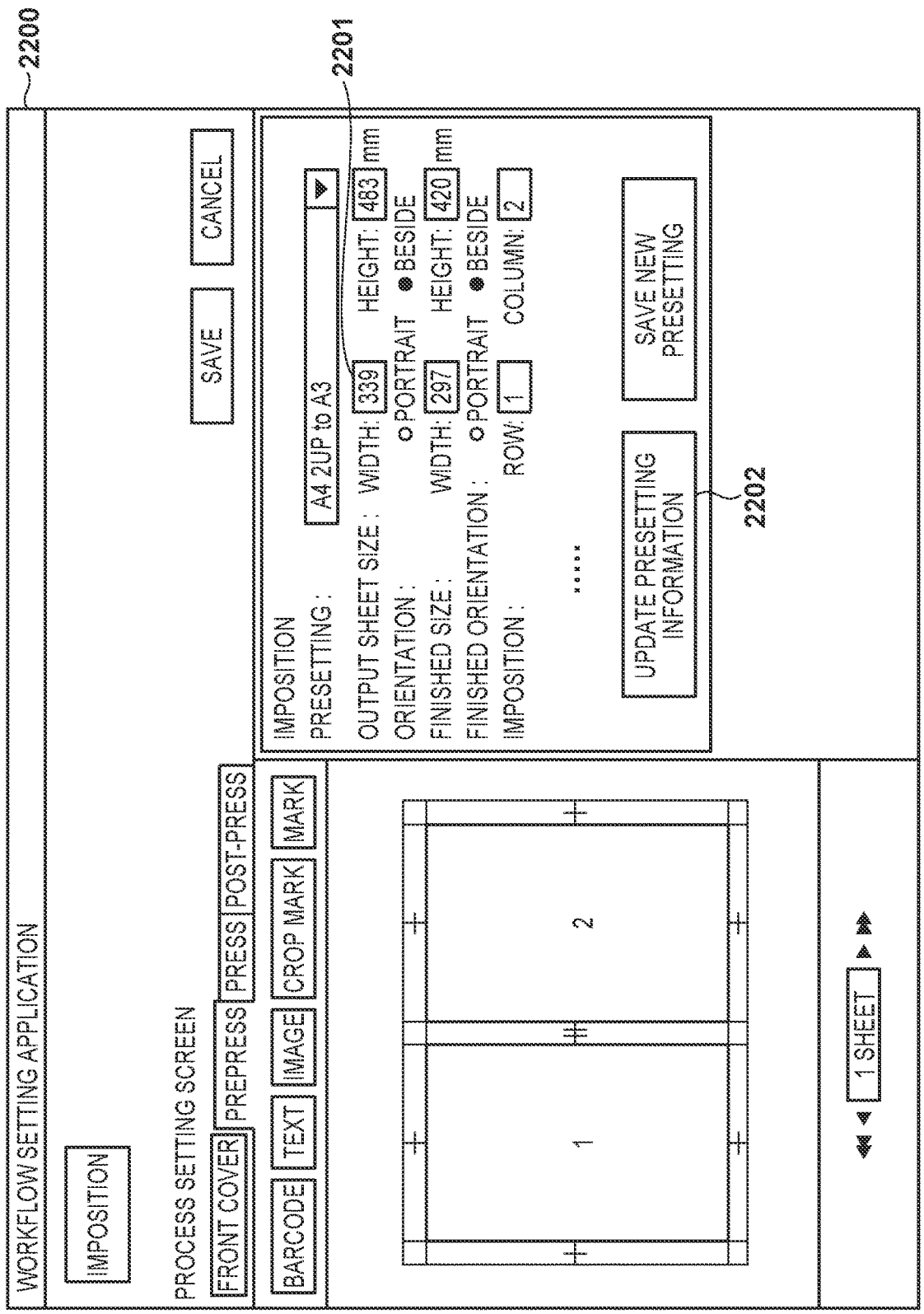
FIG. 22 is a view showing the arrangement example of an imposition setting UI screen according to this embodiment.

In step S2104, the workflow setting application 301 receives that the setting value of the presetting is corrected. FIG. 22 shows an example in which the setting value of the presetting name "A4 2UP to A3" is corrected. In this case, the output sheet size (width) is changed from "329" to "339" (setting 2201).

In step S2105, the workflow setting application 301 receives that a presetting information updating button 2202 is pressed on the workflow process setting screen 2200. In response to this, the process advances to step S2106.

In step S2106, the workflow setting application 301 updates the presetting information. If the presetting information table (FIG. 10A) is overwritten by the corrected value, this correction is reflected on all parts/processes (the body part and the front cover part) used for this presetting. This is advantageously collective correction. On the other hand, if a correction application range is to be limited (for example, correction is made for only the front cover part), the workflow setting application 301 cannot cope with this. The details of this process will be described with reference to FIG. 23.

Figure 23:
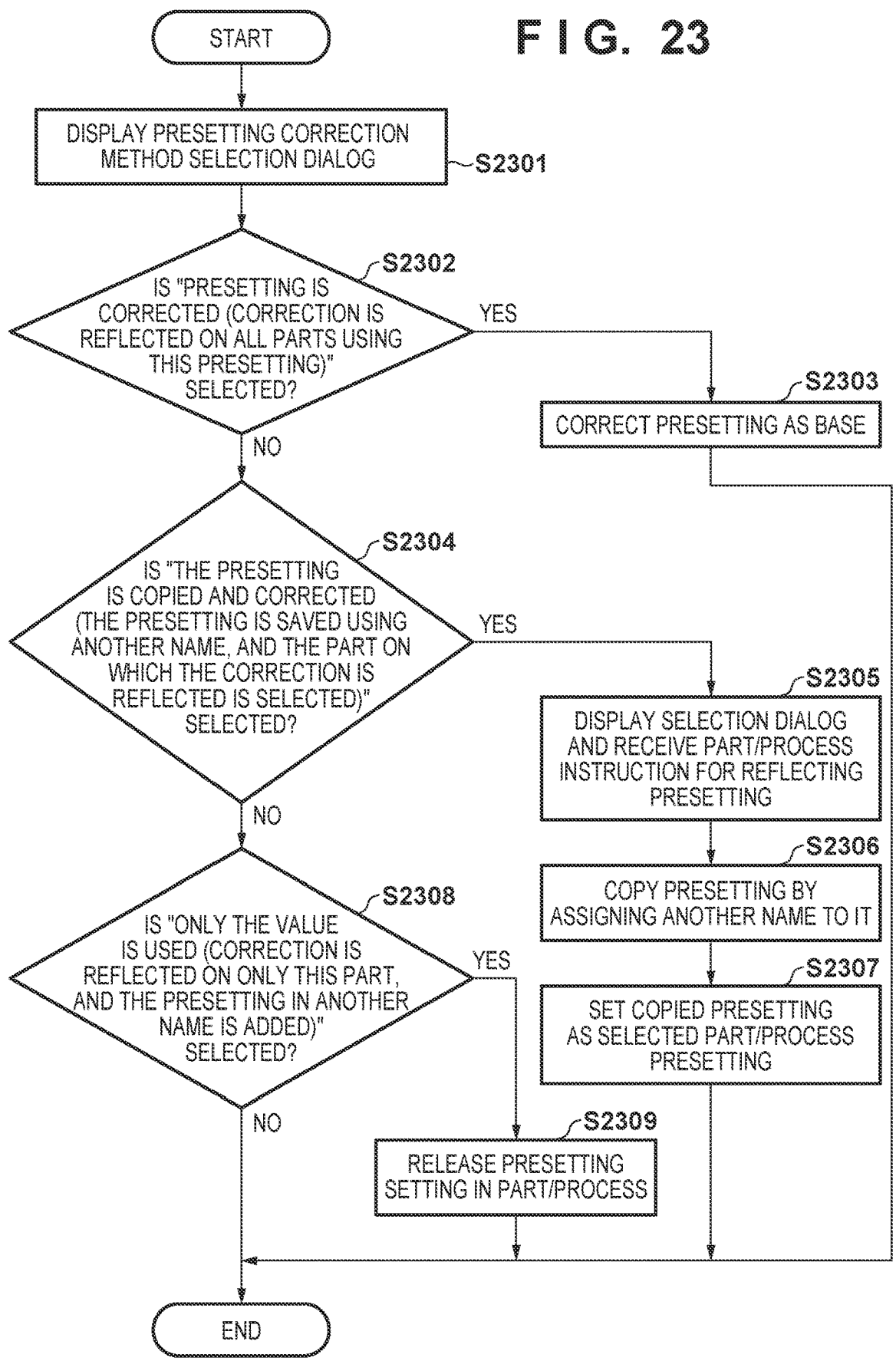
FIG. 23 is a flowchart of a presetting information updating process according to this embodiment.

FIG. 23 is a flowchart showing the details of processing for updating the presetting information. This processing corresponds to the process in step S2106 in FIG. 21.

Figure 24:
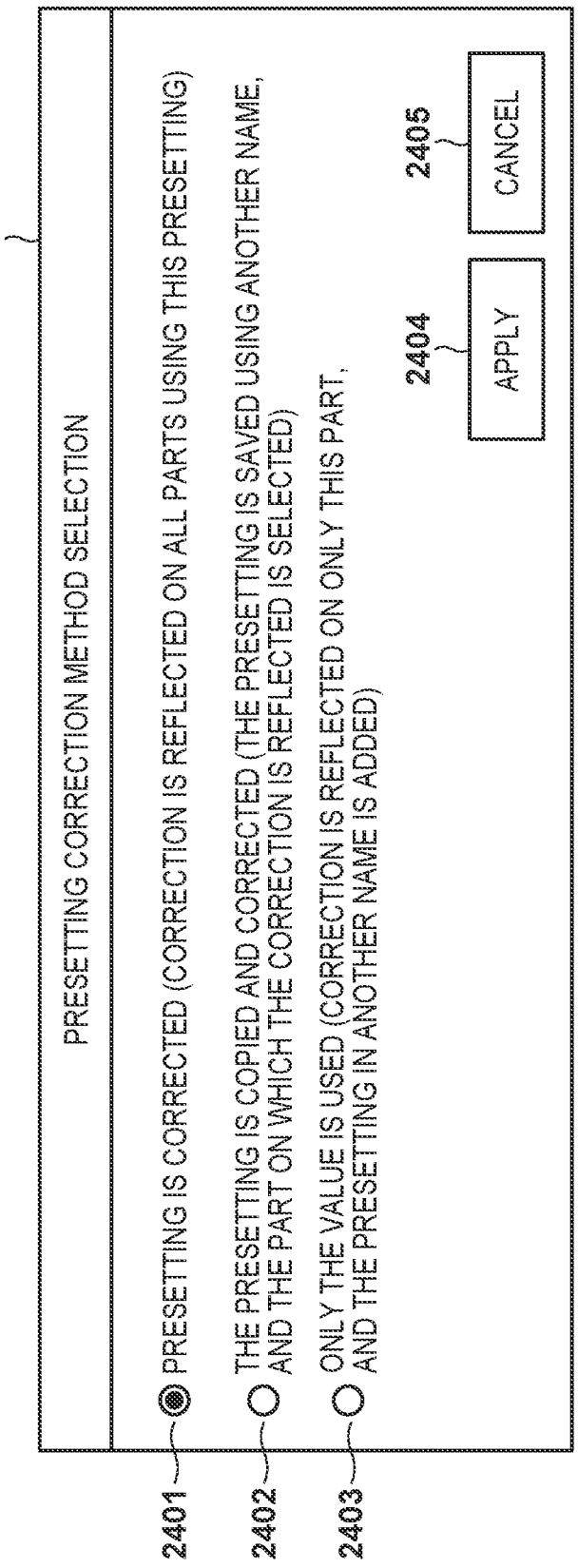
FIG. 24 is a view showing the arrangement example of a presetting correction method selection dialog according to this embodiment.

In step S2301, the workflow setting application 301 displays a presetting correction method selection dialog. FIG. 24 shows an example of a presetting correction method selection dialog 2400 according to this embodiment. In the presetting correction method selection dialog 2400, three settings 2401 to 2403, that is, "presetting is corrected (correction is reflected on all parts using this presetting)", "the presetting is copied and corrected (the presetting is saved using another name, and the part on which the correction is reflected is selected)", and "only the value is used (correction is reflected on only this part, and the presetting in another name is added)". When one of the settings 2401 to 2403 is selected and an application button 2404 or a cancel button 2405 is pressed, the workflow setting application 301 advances the process to step S2302.

In step S2302, the workflow setting application 301 selects the setting 2401, that is, "presetting is corrected (correction is reflected on all parts using this presetting)". At the same time, the workflow setting application 301 determines whether the application button 2404 is pressed. If the setting 2401 is selected and the application button 2404 is pressed (YES in step S2302), the process advances to step S2303; otherwise (NO in step S2302), the process advances to step S2304.

In step S2303, the workflow setting application 301 corrects the presetting as the base. In the above example, the workflow control module 303 corrects the presetting value information table (FIG. 10A) stored in the workflow DB 305, and the data management module 304 overwrites and saves it. By correcting the presetting as the base, this correction is reflected on all the parts/processes using this presetting. This flowchart then ends.

In step S2304, the workflow setting application 301 selects the setting 2402, that is, "the presetting is copied and corrected (the presetting is saved using another name, and the part on which the correction is reflected is selected)". At the same time, the workflow setting application 301 determines whether the application button 2404 is pressed. If the setting 2402 is selected and the application button 2404 is pressed (YES in step S2304), the process advances to step S2305; otherwise (NO in step S2304), the process advances to step S2308.

In step S2305, the workflow setting application 301 displays a selection dialog and receives a part/process instruction for reflecting the presetting. In this case, the selection of the part/process which reflects correction from the list of parts/processes using the corresponding presetting is received. FIG. 25A shows an example of a selection dialog 2500 to be displayed in this step. The list of parts/processes using the corresponding presetting can be obtained from the part and process information tables (for example, FIGS. 10C and 10D) linked with the presetting name "A4 2UP to A3" of the presetting value information table in FIG. 10A stored in the workflow DB 305.

In a list 2501, order information (an order source and a product) and other parts used in the order information are displayed in the selection dialog 2500 in FIG. 25A. In the list 2501, parts serving as reflection targets for correction can be selectively displayed. In a control 2502, a new presetting name upon correction can be designated. A "select all" button 2503 is pressed when all parts displayed on the list 2501 are to be selected. An application button 2504 is a button for designating the application of the settings designated on the selection dialog 2500. A cancel button 2505 is a button for canceling the application of the settings designated on the selection dialog 2500. As other parts which can reflect the presetting, parts are not limited to the ones of the same type, but may be a plurality of types of parts (in this case, "body" and "front cover") as shown in the selection dialog 2500.

FIG. 25B is a view showing another example of the selection dialog. FIG. 25B shows an example in which in a selection dialog 2510, when the same presetting is used for a plurality of other workflows, a list 2511 also includes the above example. The selection dialog 2510 in FIG. 25B displays that the order source (customer) of the product and the product are identifiably displayed.

In step S2306, the workflow setting application 301 copies the presetting by assigning another name to it. The data management module 304 copies the presetting information table (FIG. 10A) on the workflow DB 305. A new presetting name "A4 2UP to A3 revised" designated in the selection dialog 2500 in step S2305 is assigned to the presetting information table and saved (FIG. 12C). At this time, a setting value information table (FIG. 12D) linked with the setting value ID "000026" is newly created and stored in the data management module 304.

In step S2307, the workflow setting application 301 sets the copied presetting as the selected part/process presetting. If the "body" part is selected, the presetting item value of the part and process information table in FIG. 10C is changed to "A4 2UP to A3 revised". Accordingly, the presetting information (FIG. 12C) copied in step S2306 and the setting value information table (FIG. 12D) are linked with each other. This reflects the change from "329" to "339" for the value of the output sheet size (width).

An example of "B company: "body" part and "front cover" part of folding" in the selection dialog 2510 of FIG. 25B will be described below. As displayed in the list 2511 of the selection dialog 2510, the "A4 2UP to A3" is originally applied to the "B company: "body" part and "front cover" part of folding". More specifically, as shown in the part and process information tables in FIGS. 13A and 13B, the "A4 2UP to A3" is set in the presetting item. The values of the presetting information table (FIG. 10A) and the setting value information table (FIG. 10B) linked with the presetting name "A4 2UP to A3" have been set.

At the time of this setting, when the "body" part is selected in the correction application range as in a setting 2512 and the application button 2504 is pressed in the selection dialog 2510, the "A4 2UP to A3 revised" is set in the presetting item as in the part and process information table shown in FIG. 13C. The values of the presetting information table (FIG. 12C) in which the presetting name "A4 2UP to A3 revised" to the above "body" part, and the setting value information table (FIG. 12D) are set. As a result, the correction of the output sheet size (width) from "329" to "339" is reflected. On the other hand, when the "front cover" part is not selected as the correction application range as in the setting 2512 and the application button 2504 is pressed in the selection dialog 2510, the setting values of the part and process information table in FIG. 13B remain unchanged, resulting in a state in which the "A4 2UP to A3" is set for the presetting item.

In this manner, the part/process in which a new presetting is set can be collectively corrected again. Alternatively, the part/process which is not selected can be collectively corrected by correcting the original presetting while the original presetting remains unchanged. An advantage obtained by collectively correcting the presetting as described above can be obtained even for a part/process using the selected copied presetting and a part/process not selecting the copied presetting but selecting the original presetting.

In step S2308, the workflow setting application 301 determines whether the setting 2403, that is, "only the value is used (correction is reflected on only this part, and the presetting in another name is added)" is selected, and the application button 2404 is pressed. If the setting 2403 is selected and the application button 2404 is pressed (YES in step S2308), the process advances to step S2309; otherwise, that is, if the cancel button 2405 is pressed (NO in step S2308), this flowchart ends.

In step S2309, the workflow setting application 301 releases the presetting setting in the part/process. More specifically, the part and process information table shown in FIG. 10D is corrected as in FIG. 12B. In the example of FIG. 12B, the presetting of the part and process information table becomes blank (NULL), and a new setting value ID "000025" is set in the setting value ID. The value of the output sheet size (width) of the setting value information table (FIG. 12A) linked with the setting ID "000025" shown in FIG. 12A is "339". In this selection, advantageously, the correction is reflected on only the corresponding part, and excessive presettings are not increased. This flowchart then ends.

As described above, according to this embodiment, the presetting correction contents and the application range can be correctly set at the time of correction of the presetting executed in the production of the workflow in commercial printing.

Second Embodiment

The second embodiment of the present invention will be described below. Note that the same arrangement as in the first embodiment will not be described appropriately. In the second embodiment, the input of a part/process setting is not defined as a presetting. If the same setting is made previously, this setting may be used again at a high possibility, and the presetting is automatically generated. At this time, the automatically generated presettings are set in not only the part/process being set but also a part/process having the previous setting.

[Processing Flowchart]

Figure 26:
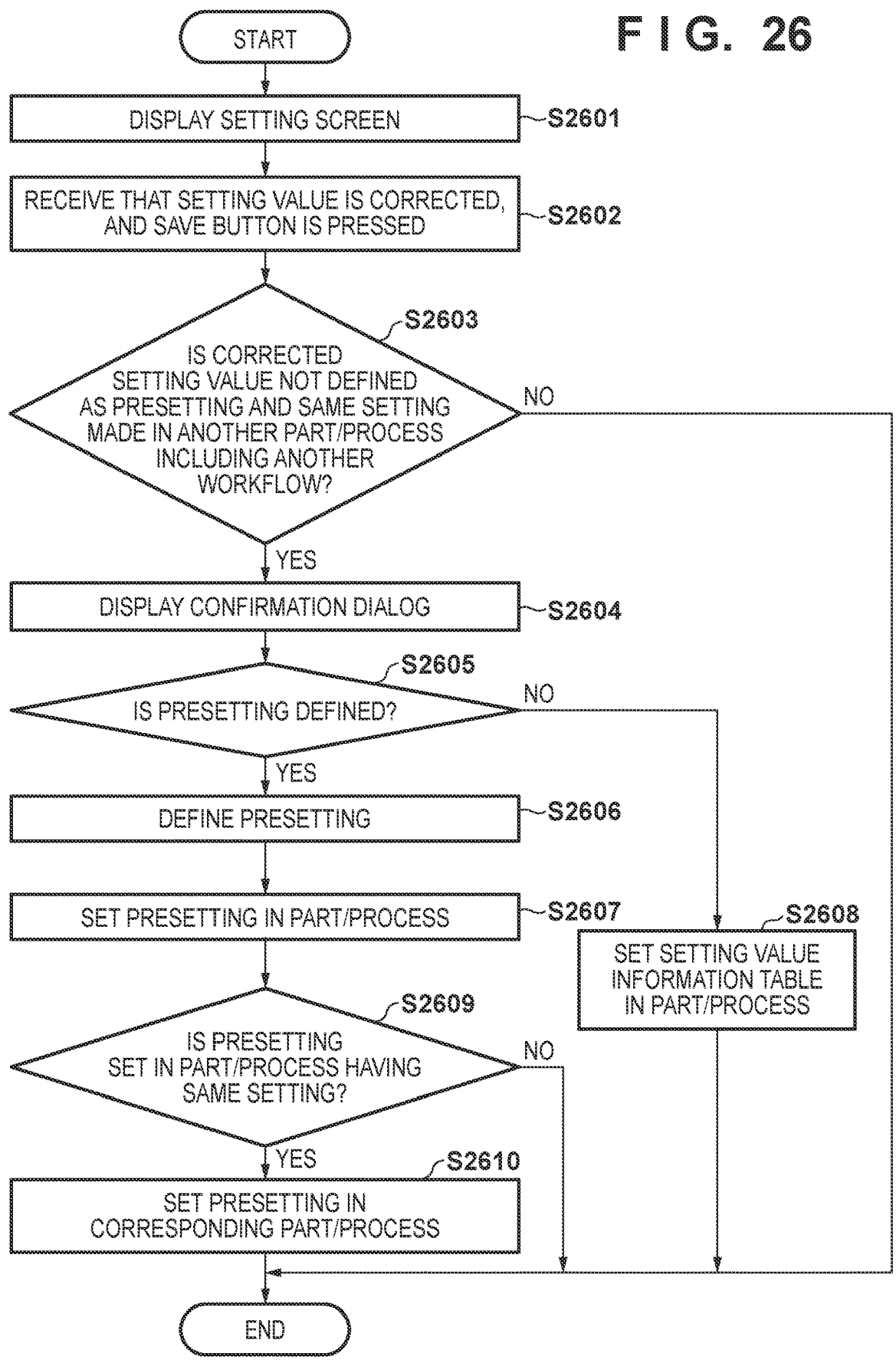
FIG. 26 is a flowchart of a process according to a second embodiment.

FIG. 26 is a flowchart showing processing according to the second embodiment. This flowchart is implemented when a CPU 201 of an information processing apparatus 101 reads out and executes the program of a workflow setting application 301.

In step S2601, the workflow setting application 301 displays a workflow process setting screen 1500. This step is the same processing as in step S1401 of FIG. 14 described in the first embodiment. As described above, the workflow process setting screen 1500 shown in FIG. 15A shows an imposition setting screen in the prepress process of the front cover part.

Figure 27:
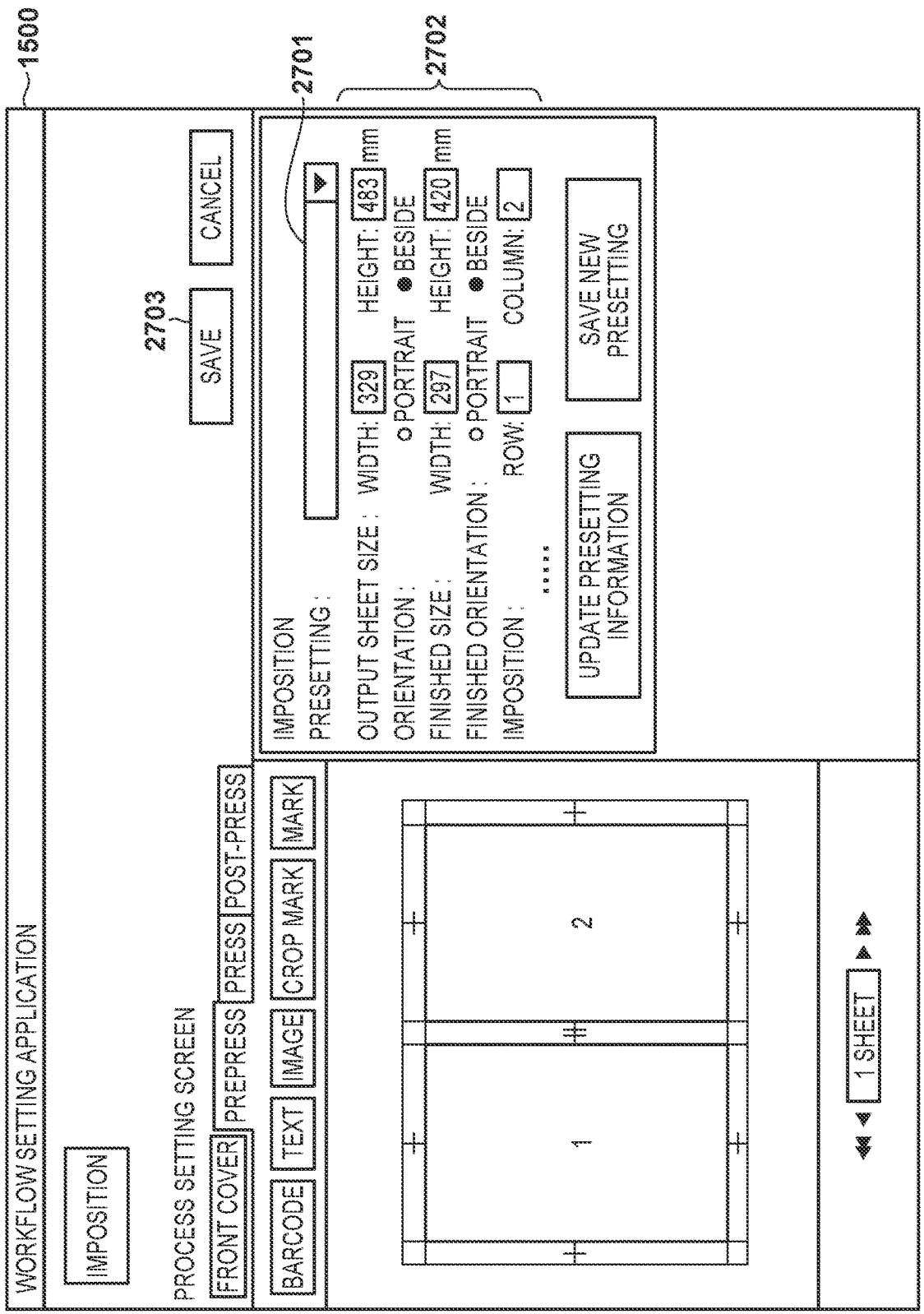
FIG. 27 is a view showing the arrangement example of an imposition setting UI screen according to the second embodiment.

In step S2602, the workflow setting application 301 receives that a setting value on the workflow process setting screen 1500 is corrected, and a save button 2703 is pressed. FIG. 27 shows an example in which the imposition setting in the front cover part prepress process is corrected on the workflow process setting screen 1500 (a setting 2702). In the example of FIG. 20, since the presetting is not selected, the field is blank (NULL) (a setting 2701). In this state, the save button 2703 is pressed to confirm the correction contents.

In step S2603, the workflow setting application 301 determines whether the corrected setting value is not defined as the presetting, and the same setting is made in another part/process including another workflow. If the above conditions are satisfied (YES in step S2603), the process advances to step S2604. If the above conditions are not satisfied (NO in step S2603), this flowchart ends. Whether the above conditions are satisfied can be determined by the facts that there are setting value information tables (for example, FIG. 10B) having the same settings and there is no presetting information table (for example, FIG. 10A) linked with the setting value ID of the above setting value information table. The presetting definition and the setting value linked with the presetting definition are stored in a workflow DB 305 as the presetting information table and the setting value information table.

Figure 28:
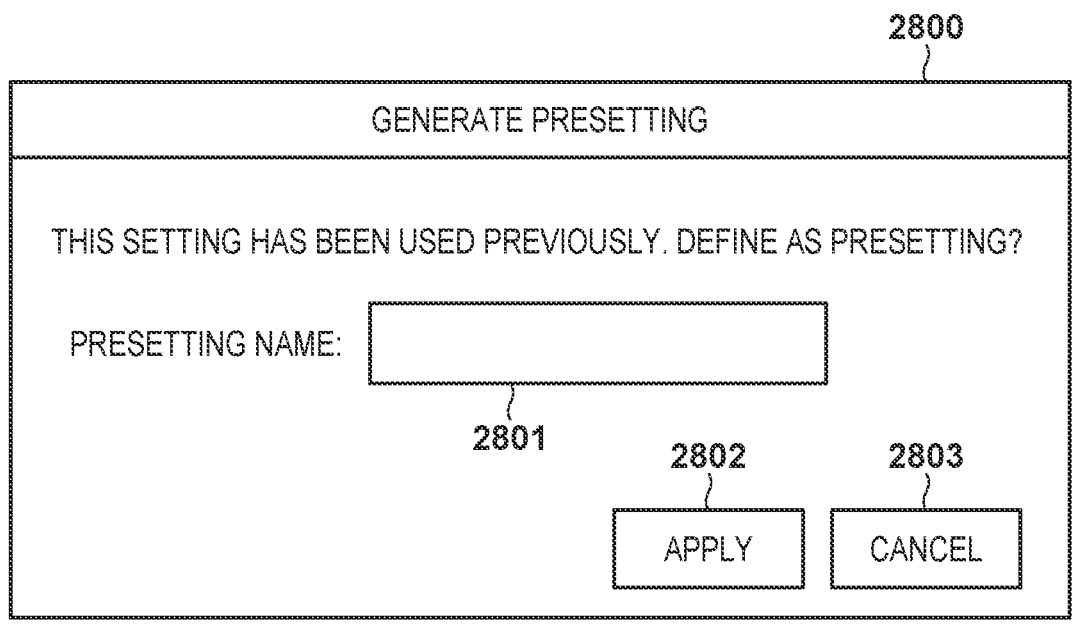
FIG. 28 is a view showing the arrangement example of a confirmation dialog according to the second embodiment.

In step S2604, the workflow setting application 301 displays a confirmation dialog. FIG. 28 shows the arrangement example of a confirmation dialog 2800 according to this embodiment. The confirmation dialog 2800 is configured to include a controller 2801 for inputting a presetting name at the time of presetting definition. In addition, the confirmation dialog 2800 also includes an application button 2802 for instructing presetting generation and a cancel button 2803 for canceling this designation.

In step S2605, the workflow setting application 301 determines whether the presetting is defined. If the application button 2802 is pressed in the confirmation dialog 2800 in FIG. 28 (YES in step S2605), the process advances to step S2606. If the cancel button 2803 is pressed (NO in step S2605), the process advances to step S2608.

In step S2606, the workflow setting application 301 defines the presetting. A workflow control module 303 creates a presetting information table shown in FIG. 30A and a setting value information table (FIG. 30B) linked with the presetting information table. A data management module 304 stores the generated tables in the workflow DB 305.

In step S2607, the workflow setting application 301 sets the presetting in a part/process. More specifically, the value "2UP" of the presetting item of the presetting information table in FIG. 30A is set in the presetting item of the part and process information table, as shown in FIG. 30C.

In step S2608, the workflow setting application 301 sets the setting value information table in the part/process. More specifically, a value "000027" of the setting value ID item of the setting value information table in FIG. 30B is set in the setting value ID item of the part and process information table, as shown in FIG. 30D. The workflow control module 303 creates the part and process information table and the setting value information table. The data management module 304 stores the generated tables in the workflow DB 305. Note that the presetting is not defined in this step.

In step S2609, the workflow setting application 301 determines whether the presetting defined also in the part/process and having the same setting including another workflow is applied. FIG. 29A shows the arrangement example of a confirmation dialog 2900 displayed in this step. The workflow setting application 301 performs determination based on designation input via the confirmation dialog 2900. The confirmation dialog 2900 is configured to include a list 2901 of another part/process which has the same setting and to which the presetting can be applied. The list 2901 is displayed to select an applicable part/process. An application button 2902 is a button for designating the application of the presetting. A cancel button 2903 is a button for canceling the application of the presetting. FIG. 29B shows a display example of a confirmation dialog 2210 when there are a plurality of parts having the same previous setting. A list of parts for a plurality of products is displayed as a list 2911. If the application button 2902 is pressed (YES in step S2609), the process advances to step S2610. If the cancel button 2903 is pressed (NO in step S2609), this flowchart ends.

In step S2610, the workflow setting application 301 sets the presetting in the corresponding part/process. As shown in FIG. 30E, a value "2UP" of the presetting item of the presetting information table in FIG. 30A is set in the presetting item of the part and process information table of the "body" part selected in the confirmation dialog 2900 in FIG. 29A. Accordingly, the presetting information shown in FIG. 30A is shared by the "front cover" part and the "body" part. This flowchart then ends.

As described above, according to this embodiment, in addition to the effect of the first embodiment, the presetting can be automatically generated as presetting to be used again for the previously set presetting. Accordingly, the convenience of the user's workflow setting can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-050234, filed Mar. 18, 2019, which is hereby incorporated by reference herein in its entirety.

What is claimed is:

1. An information processing apparatus comprising:
   a setting unit configured to receive designation of a setting value for one or a plurality of parts if a workflow for generating a product formed by one or a plurality of parts is set;
   a management unit configured to manage, as a setting value for a part, a presetting in which a set of setting values capable of being shared is defined;
   wherein if a change in a setting value for a part to which a setting is made using a first presetting managed by the managing unit is received, the setting unit further receives designation of a range which reflects the change in the setting value.

2. The apparatus according to claim 1, wherein
   as the range,
   one of the change in the setting value of the first presetting, a change in only a setting value for a part receiving the change in the setting value, and generation of a second presetting as a new presetting using a changed setting value can be designated.

3. The apparatus according to claim 2, wherein if the generation of the second presetting is designated as the range, the setting unit displays a list of other parts set using the first presetting and further receives designation of a part whose setting value is changed using the second presetting out of the other parts shown in the list.

4. The apparatus according to claim 1, wherein if a presetting having a set of setting values having the same setting values as a set of setting values set in a part whose setting value is changed is not defined, and the set of setting values is set for the other parts, the setting unit further receives designation to determine whether a third presetting is generated as a new presetting using the set of setting values.

5. The apparatus according to claim 4, wherein if generation of the third presetting is designated, the setting unit displays a list of other parts set using the set of setting values defined as the third presetting and further receives designation of a part whose setting value is changed using the third presetting out of the other parts displayed in the list.

6. The apparatus according to claim 3, wherein the other parts are other parts constituting the product.

7. The apparatus according to claim 3, wherein the other parts are parts constituting a product different from the product.

8. A method of controlling an information processing apparatus, comprising:
receiving designation of a setting value for one or a plurality of parts if a workflow for generating a product formed by one or a plurality of parts is set;
managing, as a setting value for a part, a presetting in which a set of setting values capable of being shared is defined;
wherein if a change in a setting value for a part to which a setting is made using a first presetting managed by the managing unit is received, in the receiving, designation of a range which reflects the change in the setting value is further received.

9. A non-transitory computer-readable storage medium storing a program for causing a program to function as a setting unit configured to receive designation of a setting value for one or a plurality of parts if a workflow for generating a product formed by one or a plurality of parts is set;
a management unit configured to manage, as a setting value for a part, a presetting in which a set of setting values capable of being shared is defined;
wherein if a change in a setting value for a part to which a setting is made using a first presetting managed by the managing unit is received, the setting unit further receives designation of a range which reflects the change in the setting value.

10. The medium according to claim 9, wherein
as the range,
one of the change in the setting value of the first presetting, a change in only a setting value for a part receiving the change in the setting value, and generation of a second presetting as a new presetting using a changed setting value can be designated.

11. The medium according to claim 10, wherein if the generation of the second presetting is designated as the range, the setting unit displays a list of other parts set using the first presetting and further receives designation of a part whose setting value is changed using the second presetting out of the other parts shown in the list.

12. The medium according to claim 9, wherein if a presetting having a set of setting values having the same setting values as a set of setting values set in a part whose setting value is changed is not defined, and the set of setting values is set for the other parts, the setting unit further receives designation to determine whether a third presetting is generated as a new presetting using the set of setting values.

13. The medium according to claim 12, wherein if generation of the third presetting is designated, the setting unit displays a list of other parts set using the set of setting values defined as the third presetting and further receives designation of a part whose setting value is changed using the third presetting out of the other parts displayed in the list.

14. The medium according to claim 11, wherein the other parts are other parts constituting the product.

15. The medium according to claim 11, wherein the other parts are parts constituting a product different from the product.

* * * * *